US012633851B2

(12) United States Patent
Matsuo et al.

(10) Patent No.: US 12,633,851 B2
(45) Date of Patent: May 19, 2026

(54) POWER CONVERSION APPARATUS, MOTOR DRIVE UNIT, AND REFRIGERATION CYCLE APPLICATION APPARATUS

(71) Applicant: Mitsubishi Electric Corporation, Tokyo (JP)

(72) Inventors: Haruka Matsuo, Tokyo (JP); Tomohiro Kutsuki, Tokyo (JP); Takaaki Takahara, Tokyo (JP); Koichi Arisawa, Tokyo (JP); Yuki Taniyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 195 days.

(21) Appl. No.: 18/699,694

(22) PCT Filed: Dec. 3, 2021

(86) PCT No.: PCT/JP2021/044502
§ 371 (c)(1),
(2) Date: Apr. 9, 2024

(87) PCT Pub. No.: WO2023/100360
PCT Pub. Date: Jun. 8, 2023

(65) Prior Publication Data
US 2025/0219559 A1     Jul. 3, 2025

(51) Int. Cl.
*H02P 21/05*     (2006.01)
*F25B 31/02*     (2006.01)
(Continued)

(52) U.S. Cl.
CPC .............. *H02P 21/05* (2013.01); *F25B 31/02* (2013.01); *H02P 21/22* (2016.02); *H02P 27/12* (2013.01)

(58) Field of Classification Search
CPC .......... H02P 21/05; H02P 21/22; H02P 27/06; H02P 27/12; F25B 31/02
See application file for complete search history.

(56) References Cited

U.S. PATENT DOCUMENTS 7,650,760 B2   1/2010   Nakata et al.
9,166,514 B2 *   10/2015   Niwa ...................... H02P 27/04
(Continued)

FOREIGN PATENT DOCUMENTS

EP     2667502 A1   11/2013
EP     3537583 A1   9/2019
(Continued)

OTHER PUBLICATIONS

Office Action dated Jun. 20, 2025 issued in the related Chinese Patent Application No. 202080106184.3 (and English translation).
(Continued)

*Primary Examiner* — Thai T Dinh
(74) *Attorney, Agent, or Firm* — Posz Law Group, PLC

(57) ABSTRACT

A power conversion apparatus includes a converter that rectifies a first AC voltage supplied from an AC source, a capacitor that is connected to an output end of the converter and smooths a first DC voltage rectified by the converter into a second DC voltage including a first ripple, an inverter that is connected across the capacitor and converts the second DC voltage into a second AC voltage corresponding to a desired frequency, and a voltage detection unit that acquires a physical quantity correlated with the second DC voltage, and controls the second AC voltage to superimpose a second ripple correlated with the first ripple on an output voltage of the inverter.

17 Claims, 13 Drawing Sheets

(51) Int. Cl.
H02P 21/22 (2016.01)
H02P 27/12 (2006.01)

(56) References Cited

U.S. PATENT DOCUMENTS

| | | | | |
|---|---|---|---|---|
| 10,439,542 | B2 | 10/2019 | Taniguchi et al. | |
| 10,511,233 | B2 | 12/2019 | Ogawa et al. | |
| 11,043,905 | B2 * | 6/2021 | Ono | H02M 1/4208 |
| 11,196,356 | B2 | 12/2021 | Hiranuma et al. | |
| 12,316,237 | B2 * | 5/2025 | Takahara | H02M 5/458 |
| 2012/0113693 | A1 | 5/2012 | Sekimoto et al. | |
| 2013/0300327 | A1 | 11/2013 | Sekimoto et al. | |
| 2014/0062354 | A1 | 3/2014 | Choi et al. | |
| 2015/0365038 | A1 | 12/2015 | Saha et al. | |
| 2016/0218624 | A1 | 7/2016 | Ishizeki et al. | |
| 2018/0145602 | A1 | 5/2018 | Wei et al. | |
| 2019/0280606 | A1 | 9/2019 | Ono et al. | |
| 2020/0212818 | A1 | 7/2020 | Kataoka et al. | |
| 2023/0308025 | A1 | 9/2023 | Takahara et al. | |
| 2023/0336090 | A1 | 10/2023 | Takahara et al. | |
| 2023/0378867 | A1 * | 11/2023 | Takahara | H02M 1/0048 |

FOREIGN PATENT DOCUMENTS

| | | | |
|---|---|---|---|
| JP | H02-269477 | A | 11/1990 |
| JP | H07-071805 | A | 3/1995 |
| JP | H10-248300 | A | 9/1998 |
| JP | 2001-037281 | A | 2/2001 |
| JP | 2002-051589 | A | 2/2002 |
| JP | 2004-343993 | A | 12/2004 |
| JP | 2005-020836 | A | 1/2005 |
| JP | 2011-205729 | A | 10/2011 |
| JP | 2012-157242 | A | 8/2012 |
| JP | 2012-196142 | A | 10/2012 |
| JP | 2016-073203 | A | 5/2016 |
| JP | 2019-161757 | A | 9/2019 |

OTHER PUBLICATIONS

Office Action mailed on Jun. 23, 2025 issued in corresponding Chinese Patent Application No. 202080106399.5 (and English machine translation).

Office Action dated Jun. 10, 2025 issued in the related Chinese Patent Application No. 202080106414.6 (and English translation).

Non-Final Office Action issued on Mar. 14, 2025 in related U.S. Appl. No. 18/044,096.

Final Office Action issued on Jul. 30, 2025 in related U.S. Appl. No. 18/044,096.

Office Action issued Nov. 3, 2025, in related U.S. Appl. No. 18/044,096.

International Search Report of the International Searching Authority mailed Feb. 1, 2022 in corresponding International Application No. PCT/JP2021/044502 (and English translation).

International Search Report of the International Searching Authority mailed Dec. 1, 2020 for the corresponding international application No. PCT/JP2020/040131 (and English Translation).

Extended European Search Report dated Nov. 6, 2023 issued for the corresponding European Patent Application No. 20959702.0.

Office Action dated Nov. 14, 2023 issued for the corresponding Indian Patent Application No. 202327013852 (and English translation).

Office Action dated Dec. 11, 2023 issued for the corresponding Australian Patent Application No. 2020475165.

International Search Report of the International Searching Authority mailed Dec. 1, 2020, issued in corresponding International Application No. PCT/JP2020/040133 (and English Machine Translation).

Office Action dated Nov. 16, 2023 issued in corresponding IN patent application No. 202327013851.

Office Action mailed Dec. 26, 2023 in corresponding Japanese Patent Application No. 2022-558619 (and English machine translation).

International Search Report of the International Searching Authority mailed Dec. 1, 2020, issued in corresponding International Application No. PCT/JP2020/040132 (and English machine translation).

Indian Office Action mailed Nov. 24, 2023 in corresponding Indian Patent Application No. 202327017512 (and English translation).

Office Action mailed on Jan. 31, 2026 issued in related Chinese Patent Application No. 202080106414.6 (and partial English machine translation).

Hearing Notice mailed on Feb. 26, 2026 for the corresponding Indian Patent Application No. 202327013852.

* cited by examiner

400

START

ACQUIRE PHYSICAL QUANTITY CORRELATED WITH DC BUS VOLTAGE ⌐S1

IDENTIFY FIRST RIPPLE ⌐S2

GENERATE q-AXIS CURRENT COMMAND TO SUPERIMPOSE SECOND RIPPLE ON OUTPUT VOLTAGE FROM INVERTER ⌐S3

END

400

91          92

PROCESSOR     MEMORY

POWER CONVERSION APPARATUS, MOTOR DRIVE UNIT, AND REFRIGERATION CYCLE APPLICATION APPARATUS

CROSS-REFERENCE TO RELATED APPLICATION

This application is a U.S. National Stage Application of PCT/JP2021/044502 filed on Dec. 3, 2021, the contents of which are incorporated herein by reference.

FIELD

The present disclosure relates to a power conversion apparatus that converts AC power into desired power, a motor drive unit, and a refrigeration cycle application apparatus.

BACKGROUND

There have been power conversion apparatuses that convert AC power supplied from an AC source into desired AC power and supply the AC power to a load such as an air conditioner. For example, Patent Literature 1 discloses a technique in which a power conversion apparatus that is a controller of an air conditioner rectifies AC power supplied from an AC source by a diode stack that is a rectifier unit, converts the power further smoothed by a smoothing capacitor into desired AC power by an inverter consisting of a plurality of switching elements, and outputs the AC power to a compressor motor that is a load.

PATENT LITERATURE

Patent Literature 1: Japanese Patent Application Laid-open No. H07-071805

However, the above conventional technique has a problem that aging deterioration of the smoothing capacitor is accelerated because a large current flows through the smoothing capacitor. To this problem, a method of reducing ripple changes in capacitor voltage by increasing the capacitance of the smoothing capacitor, or using a smoothing capacitor having a high tolerance to deterioration caused by ripple can be considered, which, however, increases the cost of the capacitor component and increases the size of the device.

SUMMARY

The present disclosure has been made in view of the above, and an object thereof is to provide a power conversion apparatus that can reduce the deterioration of a smoothing capacitor while preventing the device from becoming larger.

In order to solve the above-described problem and achieve the object, a power conversion apparatus according to the present disclosure comprises: a converter rectifying a first AC voltage supplied from an AC source; a capacitor connected to an output end of the converter, the capacitor smoothing a first DC voltage rectified by the converter into a second DC voltage including a first ripple; an inverter connected across the capacitor, the inverter converting the second DC voltage into a second AC voltage corresponding to a desired frequency; and a detection unit acquiring a physical quantity correlated with the second DC voltage. The power conversion apparatus controls the second AC voltage to superimpose a second ripple correlated with the first ripple on an output voltage of the inverter.

The power conversion apparatus according to the present disclosure has the effect of being able to reduce the deterioration of the smoothing capacitor while preventing the device from becoming larger.

BRIEF DESCRIPTION OF DRAWINGS

FIG. 14 is a first diagram illustrating an exemplary configuration of a power conversion apparatus according to a second embodiment.

FIG. 15 is a second diagram illustrating an exemplary configuration of a power conversion apparatus according to the second embodiment.

DETAILED DESCRIPTION

Hereinafter, a power conversion apparatus, a motor drive unit, and a refrigeration cycle application apparatus according to embodiments of the present disclosure will be described in detail with reference to the drawings.

First Embodiment

Figure 1:
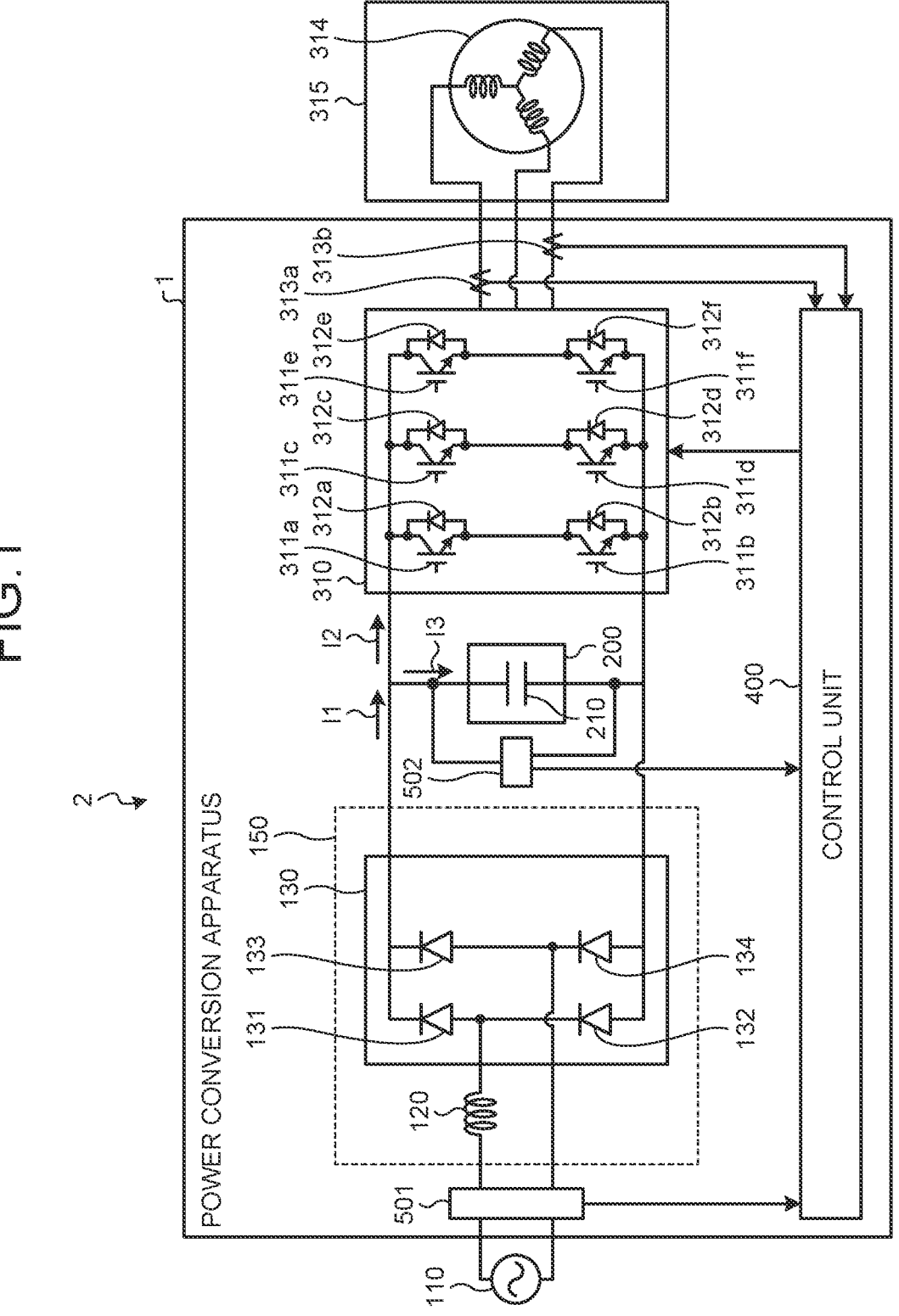
FIG. 1 is a diagram illustrating an exemplary configuration of a power conversion apparatus according to a first embodiment.

FIG. 1 is a diagram illustrating an exemplary configuration of a power conversion apparatus 1 according to a first embodiment. The power conversion apparatus 1 is connected to an AC source 110 and a compressor 315. The power conversion apparatus 1 converts a first AC voltage of a source voltage Vs supplied from the AC source 110 into a second AC voltage having desired amplitude and phases, and supplies the second AC voltage to the compressor 315. The AC source 110 may be a single-phase AC source or a three-phase AC source. The following describes a case where the AC source 110 is a single-phase AC source as an example. The power conversion apparatus 1 includes a voltage detection unit 501, a converter 150, a smoothing unit 200, a voltage detection unit 502, an inverter 310, current detection units 313*a* and 313*b*, and a control unit 400. The converter 150 includes a reactor 120 and a rectifier unit 130. The power conversion apparatus 1 and a motor 314 included in the compressor 315 constitute a motor drive unit 2.

The voltage detection unit 501 detects a voltage value of the first AC voltage of the source voltage Vs supplied from the AC source 110, and outputs the detected voltage value to the control unit 400. The voltage detection unit 501 is a detection unit that detects the power state of the first AC voltage. The voltage detection unit 501 may detect zero-crossings of the first AC voltage as the power state of the first AC voltage.

The converter 150 rectifies the first AC voltage of the source voltage Vs supplied from the AC source 110, which is a single-phase AC source. In the converter 150, the reactor 120 is connected between the AC source 110 and the rectifier unit 130. The rectifier unit 130 includes a bridge circuit composed of rectifier elements 131 to 134, and rectifies the first AC voltage of the source voltage Vs supplied from the AC source 110 for output. The rectifier unit 130 performs full-wave rectification.

The smoothing unit 200 is connected to an output end of the rectifier unit 130. The smoothing unit 200 includes a capacitor 210 as a smoothing element, and smooths the voltage rectified by the rectifier unit 130. The capacitor 210 is, for example, an electrolytic capacitor, a film capacitor, or the like. The capacitor 210 is connected to an output end of the converter 150, specifically, to the output end of the rectifier unit 130, and has a capacitance to smooth the voltage rectified by the rectifier unit 130. The voltage generated in the capacitor 210 by the smoothing does not have a full-wave rectified waveform shape of the AC source 110, but has a waveform shape in which a voltage ripple corresponding to the frequency of the AC source 110 is superimposed on the DC component, and does not pulsate greatly. When the AC source 110 is a single-phase AC source, the frequency of the voltage ripple has the main component that is a component twice the frequency of the source voltage Vs. When power input from the AC source 110 and power output from the inverter 310 do not change, the amplitude of the voltage ripple is determined by the capacitance of the capacitor 210. For example, the voltage pulsates in such a range that the maximum value of the voltage ripple generated in the capacitor 210 is less than twice the minimum value. Thus, the capacitor 210 is connected to the output end of the converter 150, and smooths a first DC voltage rectified by the converter 150 into a second DC voltage including a first ripple.

The voltage detection unit 502 detects a DC bus voltage $V_{dc}$ that is a voltage across the smoothing unit 200, that is, the capacitor 210 charged with current rectified by the rectifier unit 130 and passed from the rectifier unit 130 into the smoothing unit 200, and outputs the detected voltage value to the control unit 400. The voltage detection unit 502 is a detection unit that detects, as the power state of the capacitor 210, a physical quantity correlated with the second DC voltage including the first ripple. In the following description, the voltage detection unit 502 is sometimes referred to as a first detection unit, and the physical quantity detected by the voltage detection unit 502 as a first physical quantity.

The inverter 310 is connected across the smoothing unit 200, that is, the capacitor 210. The inverter 310 includes switching elements 311*a* to 311*f* and freewheeling diodes 312*a* to 312*f*. The inverter 310 turns the switching elements 311*a* to 311*f* on and off under the control of the control unit 400, converts the voltage output from the rectifier unit 130 and the smoothing unit 200 into the second AC voltage having the desired amplitude and phases, that is, generates the second AC voltage, and outputs the second AC voltage to the motor 314 of the compressor 315 to which the inverter 310 is connected. The inverter 310 converts the second DC voltage including the first ripple into the second AC voltage corresponding to a desired frequency.

Each of the current detection units 313*a* and 313*b* detects the current value of one phase of three-phase current output from the inverter 310, and outputs the detected current value to the control unit 400. The control unit 400 can calculate the current value of the remaining one phase output from the inverter 310 by acquiring the current values of the two phases of the current values of the three phases output from the inverter 310. The current detection units 313*a* and 313*b* are detection units that acquire a second physical quantity including a third ripple correlated with a rotational speed generated by the motor 314. In the following description, the current detection units 313*a* and 313*b* are sometimes referred to as a second detection unit.

The compressor 315 is a load including the motor 314 for compressor drive. The motor 314 rotates according to the amplitude and phases of the second AC voltage supplied from the inverter 310, performing a compression operation. When the compressor 315 is, for example, a hermetic compressor used in an air conditioner or the like, the load torque of the compressor 315 can often be regarded as a constant torque load. For the motor 314, FIG. 1 illustrates a case where motor windings are Y-connected, which is an example. The present invention is not limited to this. The motor windings in the motor 314 may be A-connected, or may be designed to be switchable between Y connection and A connection.

In the power conversion apparatus 1, the arrangement of the components illustrated in FIG. 1 is an example. The arrangement of the components is not limited to the example illustrated in FIG. 1. For example, the reactor 120 may be disposed downstream of the rectifier unit 130. The power conversion apparatus 1 may include a booster unit, or the rectifier unit 130 may have the function of a booster unit. In the following description, the voltage detection units 501 and 502 and the current detection units 313a and 313b are sometimes collectively referred to as detection units. The voltage values detected by the voltage detection units 501 and 502 and the current values detected by the current detection units 313a and 313b are sometimes referred to as detected values.

The control unit 400 acquires the voltage value of the source voltage Vs of the first AC voltage from the voltage detection unit 501, acquires the voltage value of the DC bus voltage $V_{dc}$ of the smoothing unit 200 from the voltage detection unit 502, and acquires the current values of the second AC voltage having the desired amplitude and phases converted by the inverter 310 from the current detection units 313a and 313b. The control unit 400 controls the operation of the inverter 310, specifically, performs on-off control on the switching elements 311a to 311f included in the inverter 310, using the detected values detected by the detection units. The control unit 400 controls the operation of the motor 314 using the detected values detected by the detection units. In the present embodiment, the control unit 400 controls the operation of the inverter 310 such that the second AC voltage including pulsation corresponding to the pulsation of the current flowing from the rectifier unit 130 into the capacitor 210 of the smoothing unit 200 is output from the inverter 310 to the compressor 315, which is a load. The pulsation corresponding to the pulsation of the current flowing into the capacitor 210 of the smoothing unit 200 is, for example, pulsation that varies depending on the frequency of the pulsation of the current flowing into the capacitor 210 of the smoothing unit 200, etc. Thus, the control unit 400 reduces the current flowing through the capacitor 210 of the smoothing unit 200. Note that the control unit 400 does not need to use all the detected values acquired from the detection units, and may perform control using some of the detected values. The control unit 400 controls the second AC voltage to superimpose a second ripple correlated with the first ripple detected by the voltage detection unit 502 on the output voltage from the inverter 310.

The control unit 400 performs control such that any of the speed, voltage, and current of the motor 314 reaches a desired state. Here, when the motor 314 is used to drive the compressor 315, and the compressor 315 is a hermetic compressor, it is difficult to attach a position sensor for detecting the rotor position to the motor 314 because of the structure and the cost. Therefore, the control unit 400 performs position sensorless control on the motor 314. There are two types of methods for the position sensorless control on the motor 314, constant primary flux control and sensorless vector control. In the present embodiment, as an example, a description is given based on sensorless vector control. A control method described below can be applied to constant primary flux control with minor changes. In the present embodiment, as will be described later, the control unit 400 controls the operations of the inverter 310 and the motor 314, using dq rotating coordinates that rotate in synchronization with the rotor position of the motor 314.

Next, control in the control unit 400 to reduce the current flowing through the capacitor 210 of the smoothing unit 200 will be described. As illustrated in FIG. 1, in the power conversion apparatus 1, an input current from the rectifier unit 130 to the capacitor 210 of the smoothing unit 200 is an input current I1, an output current from the capacitor 210 of the smoothing unit 200 to the inverter 310 is an output current I2, and a charging and discharging current of the capacitor 210 of the smoothing unit 200 is a charging and discharging current I3. In this case, the relationship, input current I1=output current I2+charging and discharging current I3, is established. The flow of the charging and discharging current I3 through the capacitor 210 means the charging and discharging of the capacitor 210. The charging and discharging of the capacitor 210 causes the voltage across the capacitor 210, that is, the DC bus voltage $V_{dc}$ to pulsate. Therefore, the control unit 400 performs control to reduce the pulsation of the DC bus voltage $V_{dc}$, thereby reducing the charging and discharging current I3 of the capacitor 210. By adding a current corresponding to the pulsation of the DC bus voltage $V_{dc}$ to the output current I2, the control unit 400 can reduce the charging and discharging current I3 of the capacitor 210.

Figure 2:
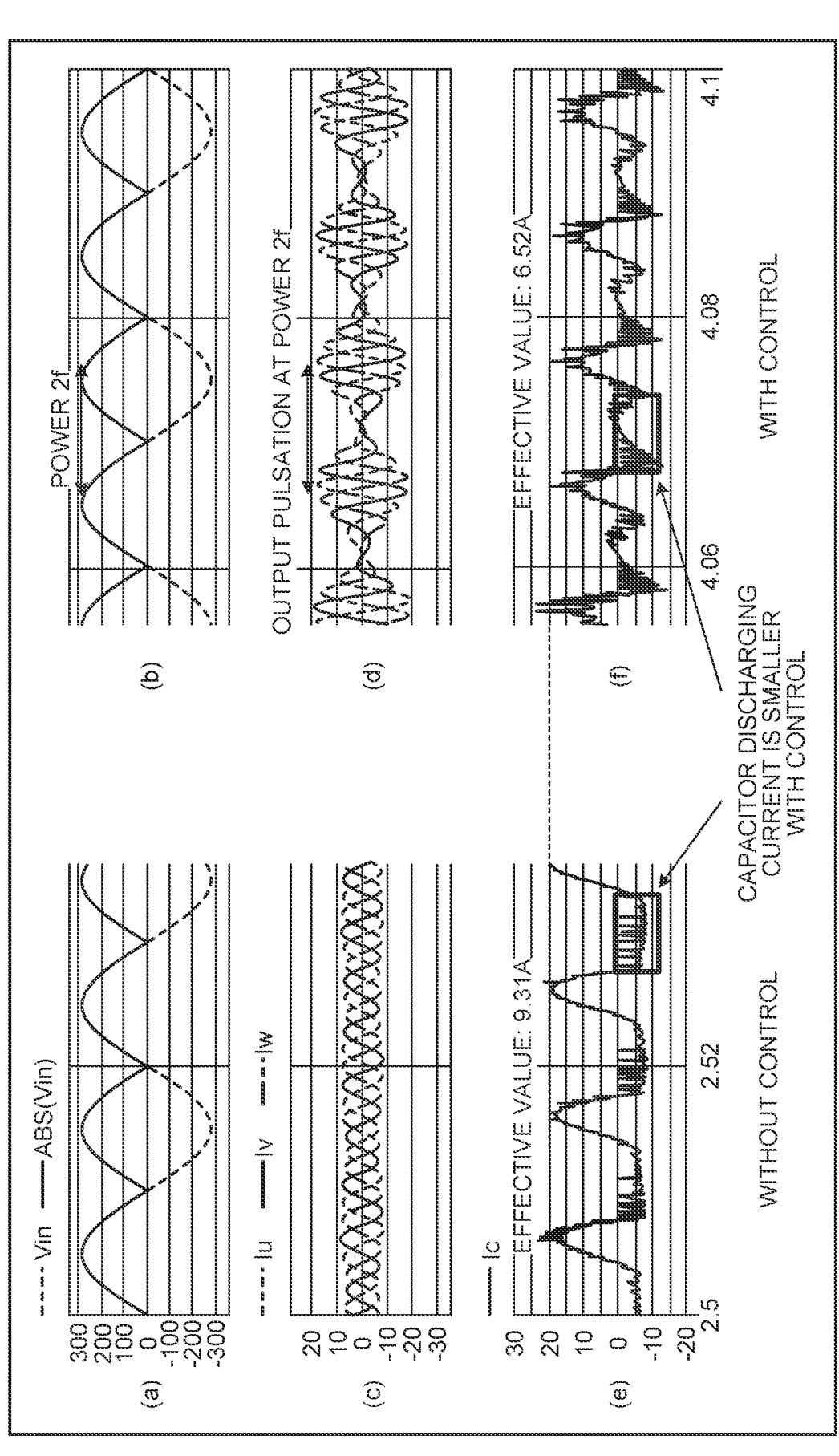
FIG. 2 is a diagram illustrating the operating state of the power conversion apparatus that depends on the presence or absence of control to reduce a charging and discharging current of a capacitor in a control unit of the power conversion apparatus according to the first embodiment.

FIG. 2 is a diagram illustrating the operating state of the power conversion apparatus 1 that depends on the presence or absence of the control to reduce the charging and discharging current I3 of the capacitor 210 in the control unit 400 of the power conversion apparatus 1 according to the first embodiment. In FIG. 2, (a) and (b) illustrate the first AC voltage of the source voltage Vs supplied from the AC source 110, and the rectified voltage output from the rectifier unit 130. In FIG. 2, (c) and (d) illustrate currents flowing from the inverter 310 to the motor 314. In FIG. 2, (e) and (f) illustrate the current flowing through the capacitor 210, that is, the charging and discharging current I3 of the capacitor 210. In FIG. 2, (a), (c), and (e) on the left side illustrate the state without the control to reduce the charging and discharging current I3 of the capacitor 210 in the control unit 400. In FIG. 2, (b), (d), and (f) on the right side illustrate the state with the control to reduce the charging and discharging current I3 of the capacitor 210 in the control unit 400.

As illustrated in (a) in FIG. 2, the rectified voltage output from the rectifier unit 130 pulsates at a frequency twice the power frequency of the AC source 110, which is a single-phase AC source. In FIG. 2, (b) illustrates those in the same state as (a). Without the control to reduce the charging and discharging current I3 of the capacitor 210 in the control unit 400, the pulsation of the DC bus voltage $V_{dc}$, that is, the pulsation of the charging and discharging current I3 of the capacitor 210 also pulsates at a frequency twice the power frequency of the AC source 110, which is a single-phase AC source, as illustrated in (e) in FIG. 2. Here, the control unit 400 performs control to add a current corresponding to the pulsation of the charging and discharging current I3 of the capacitor 210 to the output current I2, which is currents flowing from the inverter 310 to the motor 314, that is, to change from the state of (c) to the state of (d) in FIG. 2. Consequently, the charging and discharging current I3 of the capacitor 210 can be reduced as illustrated in (f) in FIG. 2. In FIG. 2, a frequency twice the power frequency of the AC source 110 is denoted as power 2f, where f is the power frequency of the AC source 110, which is a single-phase AC source, that is, the fundamental frequency of the first AC voltage. In the actual power conversion apparatus 1, pulsations in various frequency bands occur depending on the effects of wiring of the AC source 110 and the operating state of the compressor 315, which is a load, but are omitted here.

Figure 3:
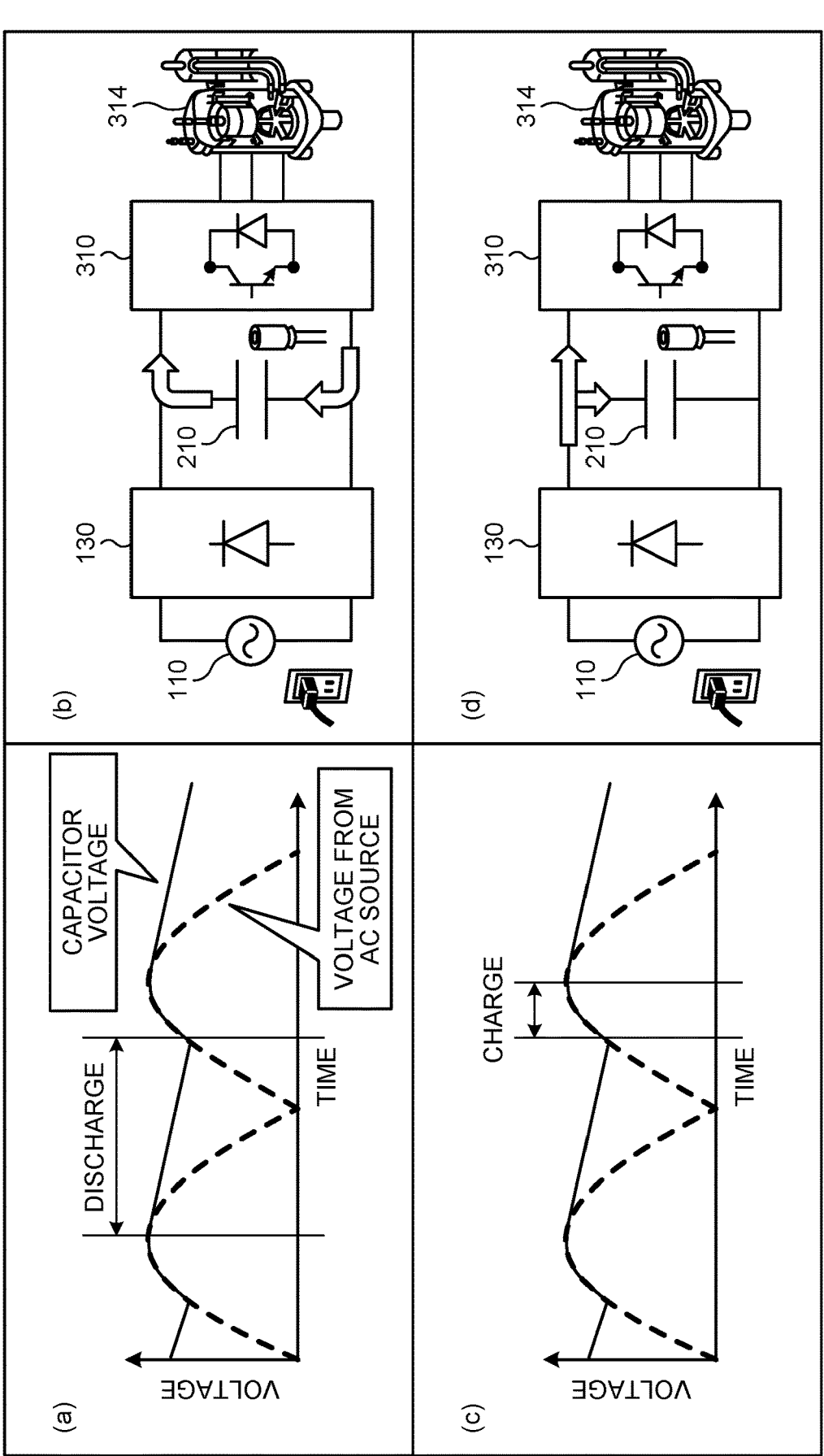
FIG. 3 is a diagram illustrating the charge and discharge states of the capacitor in the power conversion apparatus according to the first embodiment.

FIG. 3 is a diagram illustrating the charge and discharge states of the capacitor 210 in the power conversion apparatus 1 according to the first embodiment. As illustrated in (a) and (b) in FIG. 3, when the voltage from the AC source 110 is smaller than the voltage of the capacitor 210, the capacitor 210 discharges, so that current flows from the capacitor 210 through the inverter 310 to the motor 314. As illustrated in (c) and (d) in FIG. 3, when the voltage from the AC source 110 is larger than the voltage of the capacitor 210, the capacitor 210 charges by the amount of discharge, so that current flows from the AC source 110 through the rectifier unit 130 and the inverter 310 to the motor 314.

The purpose of the control by the control unit 400 to reduce the charging and discharging current I3 of the capacitor 210 is to reduce the current flowing through the capacitor 210 to reduce the capacitance of the capacitor 210. Here, a conceivable way to reduce the current flowing through the capacitor 210 is to directly detect the current flowing through the capacitor 210 to implement feedback control in the power conversion apparatus 1. However, when a current sensor is used, the cost is high. A current detection circuit using a shunt resistor is complicated in the design of measures against noise, heat, etc. In the present embodiment, as illustrated in FIG. 1, the power conversion apparatus 1 detects the DC bus voltage $V_{dc}$ correlated with the current of the capacitor 210, and the control unit 400 extracts a pulsating component and controls the output of the inverter 310 to reduce the pulsation, thereby indirectly reducing the current of the capacitor 210. In particular, by reducing the capacitance of the capacitor 210, the pulsation of the DC bus voltage $V_{dc}$ increases, so that the power conversion apparatus 1 has an advantage that the signal-to-noise (S/N) ratio is good in the detection of the DC bus voltage $V_{dc}$. Pieces of information required for this control in the present embodiment is the detected value of the DC bus voltage $V_{dc}$ and the power frequency of the AC source 110. The control unit 400 extracts the frequency component of the pulsation of the DC bus voltage $V_{dc}$ from the DC bus voltage $V_{dc}$, and generates a q-axis current command.

Figures 4, 5:
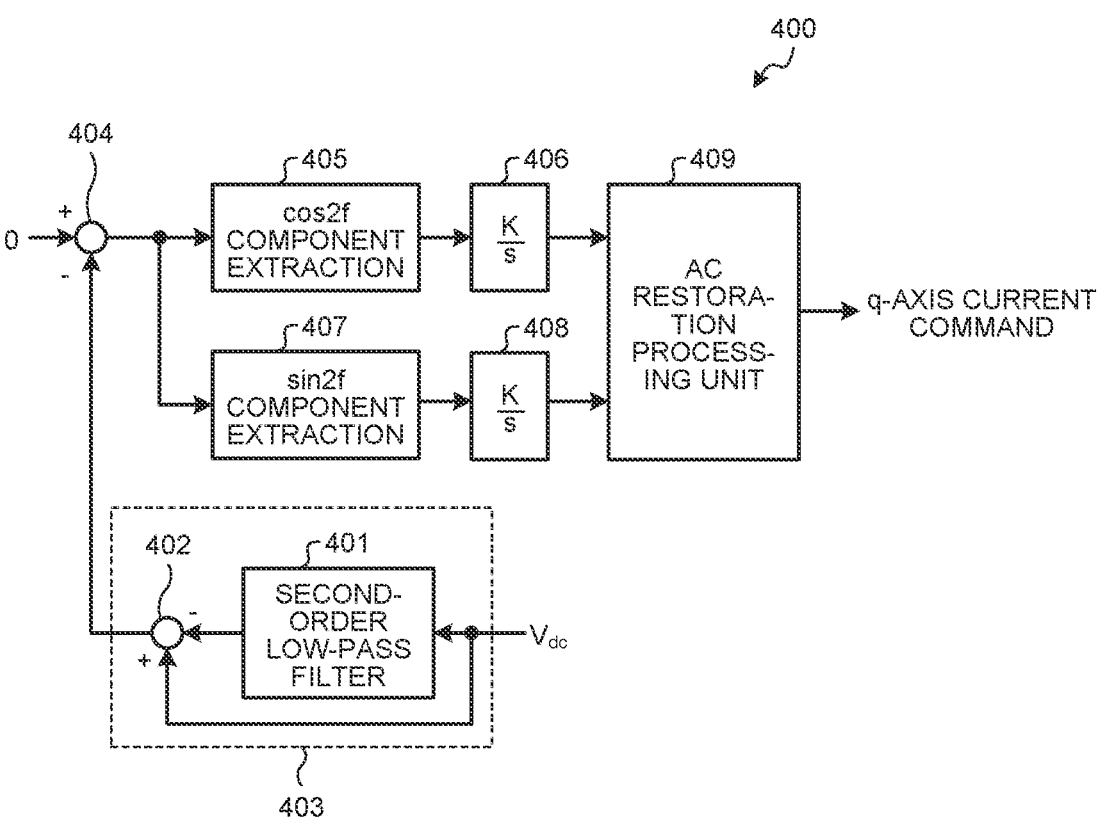
FIG. 4 is a first block diagram illustrating a configuration to generate a q-axis current command to reduce the pulsation of a DC bus voltage included in the control unit of the power conversion apparatus according to the first embodiment.
FIG. 5 is a diagram illustrating an example of a filter included in the power conversion apparatus according to the first embodiment.

FIG. 4 is a first block diagram illustrating a configuration to generate the q-axis current command to reduce the pulsation of the DC bus voltage $V_{dc}$ included in the control unit 400 of the power conversion apparatus 1 according to the first embodiment. The configuration illustrated in FIG. 4 is formed by a feedback loop in which the value of the q-axis current command is zero to make the pulsation of the DC bus voltage $V_{dc}$ zero. The DC bus voltage $V_{dc}$ can be obtained from the detected value of the voltage detection unit 502. In the following description, the value of the q-axis current command being zero is sometimes abbreviated as the command value 0.

Here, a way to detect the DC bus voltage $V_{dc}$ in the power conversion apparatus 1 will be described. In the power conversion apparatus 1, for example, the value of the DC bus voltage $V_{dc}$ divided by the resistor series ratio by the voltage detection unit 502 is typically detected by the control unit 400. However, it is only required that a physical quantity including the ripple component of the DC bus voltage $V_{dc}$ can be detected. Thus, the present invention is not limited to this way. The control to reduce the charging and discharging current I3 of the capacitor 210 does not require, in particular, the DC component of the DC bus voltage $V_{dc}$. Thus, it is not necessarily required to directly detect the voltage value of the DC bus voltage $V_{dc}$ in the way as described above. To directly detect the charging and discharging current I3 of the capacitor 210, an expensive sensor such as a direct-current current transformer (DCCT) or an alternating-current current transformer (ACCT) is required. In detection using a shunt resistor or the like, loss, heat, etc. become problems. By contrast, a circuit that detects the DC bus voltage $V_{dc}$ is generally inexpensive as compared with current detection, and is easy to introduce because there is no need to worry about loss, heat, etc. Furthermore, a circuit that detects the DC bus voltage $V_{dc}$ can be used in combination with a converter including a booster unit as in a second embodiment described later.

For timing to detect the DC bus voltage $V_{dc}$, the voltage detection unit 502 may detect the DC bus voltage $V_{dc}$ in synchronization with the carrier of the inverter 310, or may detect the DC bus voltage $V_{dc}$ in synchronization with the carrier of a converter when the converter uses a booster unit as described later. Considering the sampling theorem, the voltage detection unit 502 is only required to be able to perform sampling at a frequency at least twice the power frequency of the AC source 110, that is, to detect the DC bus voltage $V_{dc}$ at periods faster than a frequency twice the power frequency of the AC source 110. Thus, the voltage detection unit 502 detects the physical quantity at periods shorter than the frequency of the first ripple. Alternatively, the voltage detection unit 502 may detect the physical quantity in synchronization with the timing of change in conduction or nonconduction of the switching elements 311a to 311f included in the inverter 310.

For a measure against noise in a circuit that detects the DC bus voltage $V_{dc}$, the voltage value of the DC bus voltage $V_{dc}$ itself does not greatly pulsate due to the capacitor 210, but noise may be superimposed on a detected value signal line itself. Therefore, the power conversion apparatus 1 may include a filter at an input end of the control unit 400 that acquires the detected value of the DC bus voltage $V_{dc}$ from the voltage detection unit 502. FIG. is a diagram illustrating an example of a filter 513 included in the power conversion apparatus 1 according to the first embodiment. The power conversion apparatus 1 includes, for example, the filter 513 consisting of a resistor 511 and a capacitor 512. Since the pulsating component of the DC bus voltage $V_{dc}$ required by the control unit 400 is a frequency twice the power frequency of the AC source 110, the cutoff frequency of the filter 513 can be designed to be equal to or higher than the frequency twice the power frequency of the AC source 110. For example, when the resistance value of the resistor 511 is 10 kΩ and the capacitance of the capacitor 512 is 1000 pF, the cutoff frequency of the filter 513 is 16 KHz. The power conversion apparatus 1 may alternatively be configured to include a digital filter inside the control unit 400 instead of the filter 513 illustrated in FIG. 5 as long as a measure against noise can be taken. Thus, the power conversion apparatus 1 uses either an analog filter composed of electronic components to attenuate a specific frequency component, or a digital filter to attenuate a specific frequency component by the calculation of the control unit 400, to attenuate a specific frequency component of the physical quantity to attenuate noise. The cutoff frequency of the analog filter or the digital filter described above is a frequency two or more times the frequency of the first ripple.

Return to the description of FIG. 4. A second-order low-pass filter 401 allows the DC component of the DC bus voltage $V_{dc}$ to pass therethrough. A subtractor 402 subtracts the DC component of the DC bus voltage $V_{dc}$ that has passed through the second-order low-pass filter 401 from the DC bus voltage $V_{dc}$ to remove the DC component from the DC bus voltage $V_{dc}$. That is, a filter 403 is a kind of high-pass filter to remove the DC component from the DC bus voltage $V_{dc}$. The filter 403 is intended to allow highly accurate extraction of a pulsating component to be described later, and thus the filter 403 may be omitted. A subtractor 404 calculates a difference between the command value 0 and the DC bus voltage $V_{dc}$ from which the DC component has been removed.

A pulsating component extraction unit 405 DC-converts and extracts a specific frequency component, specifically, a cos 2f component from the difference between the command value 0 and the DC bus voltage $V_{dc}$ from which the DC component has been removed. The term "2f" indicates a frequency twice the power frequency of the AC source 110, that is, the fundamental frequency of the first AC voltage. A pulsating component extraction unit 407 DC-converts and extracts a specific frequency component, specifically a sin 2f component from the difference between the command value 0 and the DC bus voltage $V_{dc}$ from which the DC component has been removed. The pulsating component extraction units 405 and 407 extract and reduce only the pulsation of the specific frequency component, thereby preventing the occurrence of beats, sideband waves, etc. and making the waveform less distorted. The control unit 400 performs simple Fourier transform by integrating a trigonometric function cos 2f of the same frequency as the specific frequency component to be extracted by the pulsating component extraction unit 405 and integrating a trigonometric function sin 2f of the same frequency as the specific frequency component to be extracted by the pulsating component extraction unit 407.

For example, the DC bus voltage $V_{dc}$ from which the DC component has been removed is $V_{dc}=A \sin(\omega t)$. Note that $\omega=2\pi f_1$, and $f_1$ is 100 Hz or 120 Hz. The pulsating component extraction unit 405 calculates formula (1), and the pulsating component extraction unit 407 calculates formula (2).

$$A\sin(\omega t) \times 2\cos(\omega t) = 2A\sin(\omega t)\cos(\omega t) = A\sin(2\omega t) \qquad (1)$$

$$A\sin(\omega t) \times 2\sin(\omega t) = 2A\sin^2(\omega t) = A - A\cos(2\omega t) \qquad (2)$$

The pulsating component extraction unit 405 filters a value obtained by formula (1) with a low-pass filter to remove the sin component. Likewise, the pulsating component extraction unit 407 filters a value obtained by formula (2) with a low-pass filter to remove the cos component. Consequently, the pulsating component extraction units 405 and 407 can extract the amplitude value A of $\sin(\omega t)$. The low-pass filters used in the pulsating component extraction units 405 and 407 are designed, for example, with a cutoff frequency of $\omega/10$ since it is only required to sufficiently remove a frequency twice the frequency component to be extracted. Note that the low-pass filters used in the pulsating component extraction units 405 and 407 are not limited these. Other filters such as band-pass filters may be used as long as the amplitude value A that is the DC component can be extracted.

Figure 6:
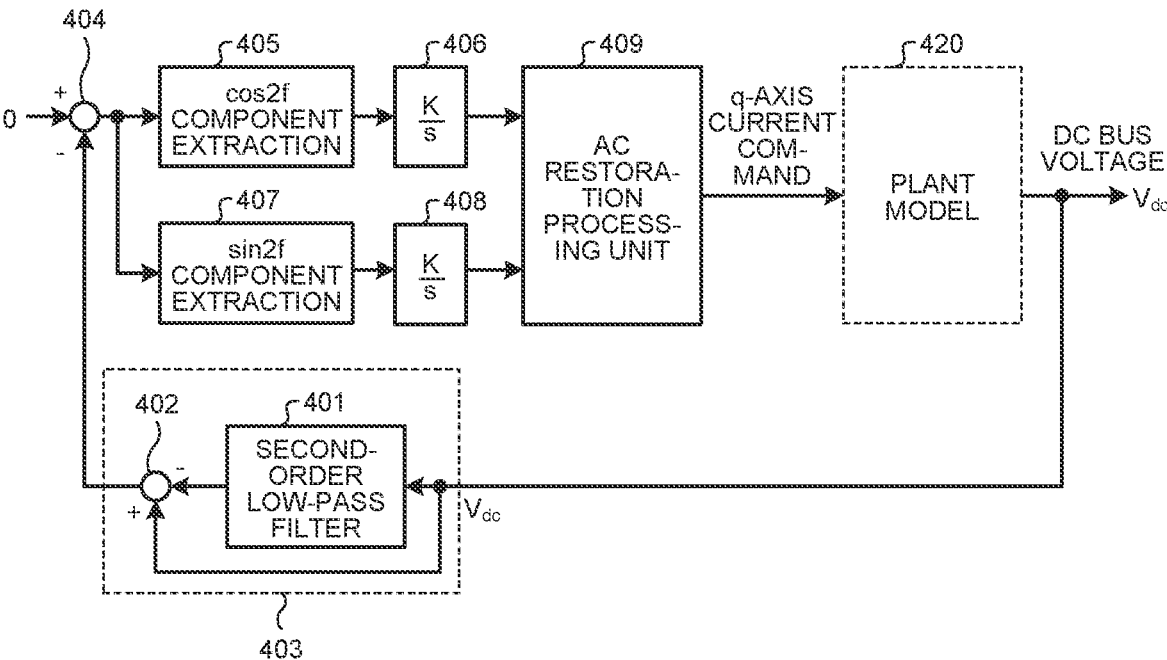
FIG. 6 is a diagram illustrating a connection example when a plant model is included in the control unit of the power conversion apparatus according to the first embodiment.

An integral control unit 406 performs integral control such that the frequency component extracted by the pulsating component extraction unit 405 becomes zero, to calculate a required amount of current. An integral control unit 408 performs integral control such that the frequency component extracted by the pulsating component extraction unit 407 becomes zero, to calculate a required amount of current. Note that the integral control units 406 and 408 may perform calculation with proportional control, differential control, etc. in combination with the integral control. A gain factor K used in the integral control units 406 and 408 is designed to be an inverse function of a function representing a plant model illustrated in FIG. 6. FIG. 6 is a diagram illustrating a connection example when a plant model 420 is included in the control unit 400 of the power conversion apparatus 1 according to the first embodiment. The actual gain factor K varies depending on a specific circuit configuration of the plant model 420, etc. The control unit 400 can perform the control to reduce the charging and discharging current I3 of the capacitor 210 with high robustness by a feedback configuration by the integral control units 406 and 408.

An AC restoration processing unit 409 receives input of the results of calculation of the integral control units 406 and 408, and restores the calculation results to one AC signal. The AC restoration processing unit 409 outputs the restored AC signal as a q-axis current command. For example, the AC restoration processing unit 409 calculates a q-axis current command $I_{qd2v}$ as in formula (3) where $I_{q2f-cos}$ is an output from the integral control unit 406 and $I_{q2f-sin}$ is an output from the integral control unit 408.

$$I_{qd2v} = I_{q2f-cos}\sin(2\omega_{in}t) - I_{q2f-sin}\cos(2\omega_{in}t) \qquad (3)$$

The AC restoration processing unit 409 shifts the phase by 90 degrees at the time of AC restoration because the phase difference between the DC bus voltage $V_{dc}$ and the charging and discharging current I3 of the capacitor 210 is 90 degrees. Consequently, the control unit 400 can pulsate the q-axis current at the same frequency as that of the DC bus voltage $V_{dc}$ and pulsate the output voltage of the inverter 310.

The inventor has confirmed by analysis that the effective value of the current flowing through the capacitor 210 is reduced by actually outputting, from the inverter 310, a pulsating component of the same frequency as twice the power frequency of the AC source 110 in the power conversion apparatus 1. The analysis results are as illustrated in FIG. 2 described above. It can be confirmed that the effective value of the capacitor current is reduced with the control to reduce the charging and discharging current I3 of the capacitor 210 as compared with that without the control to reduce the charging and discharging current I3 of the capacitor 210. This is because in the example of FIG. 3 and others, the control unit 400 reduces the charging and discharging of the capacitor 210 by increasing the inverter output when the voltage from the AC source 110 is high and decreasing the inverter output when the voltage from the AC source 110 is low.

In the example of FIG. 4, in order to reduce the pulsation of a frequency component that is twice the fundamental frequency of the first AC voltage, the control unit 400 extracts a frequency component that is twice the fundamental frequency of the first AC voltage by the pulsating component extraction units 405 and 407. When it is desired to reduce the pulsation of a harmonic component of a frequency component that is twice the fundamental frequency of the first AC voltage, for example, when it is desired to reduce the pulsation of frequency components that are two and four times the fundamental frequency of the first AC voltage, as many pulsating component extraction units and integral control units as the frequencies can be placed in parallel to extract the frequency components two and four times the fundamental frequency of the first AC voltage.

Figure 7:
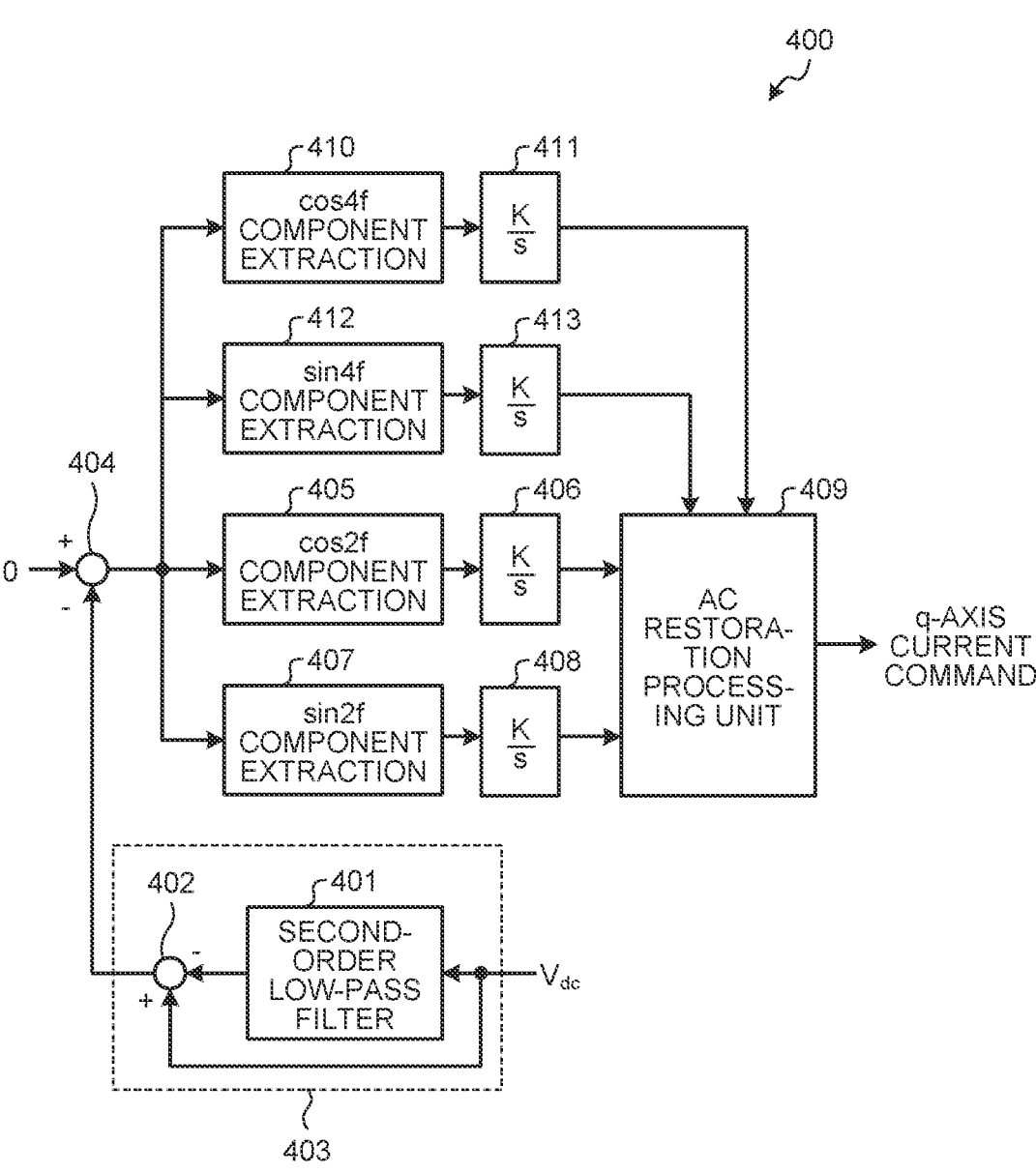
FIG. 7 is a second block diagram illustrating a configuration to generate a q-axis current command to reduce the pulsation of a DC bus voltage included in the control unit of the power conversion apparatus according to the first embodiment.

FIG. 7 is a second block diagram illustrating a configuration to generate a q-axis current command to reduce the pulsation of the DC bus voltage $V_{dc}$ included in the control unit 400 of the power conversion apparatus 1 according to the first embodiment. The configuration illustrated in FIG. 7 is obtained by adding pulsating component extraction units 410 and 412 and integral control units 411 and 413 to the configuration illustrated in FIG. 4.

The pulsating component extraction unit 410 DC-converts and extracts a specific frequency component, specifically, a cos 4f component from the difference between the command value 0 and the DC bus voltage $V_{dc}$ from which the DC component has been removed. The term "4f" indicates a frequency four times the power frequency of the AC source 110, that is, the fundamental frequency of the first AC voltage. The pulsating component extraction unit 412 DC-converts and extracts a specific frequency component, specifically, a sin 4f component from the difference between the command value 0 and the DC bus voltage $V_{dc}$ from which the DC component has been removed. Effects obtained by the pulsating component extraction units 410 and 412 are as those in the explanation of the pulsating component extraction units 405 and 407 described above.

The integral control unit 411 performs integral control such that the frequency component extracted by the pulsating component extraction unit 410 becomes zero, to calculate a required amount of current. The integral control unit 413 performs integral control such that the frequency component extracted by the pulsating component extraction unit 412 becomes zero, to calculate a required amount of current. Note that the integral control units 411 and 413 may perform calculation with proportional control, differential control, etc. in combination with the integral control.

The AC restoration processing unit 409 receives input of the results of calculation of the integral control units 406, 408, 411, and 413 and restores the calculation results to one AC signal. The AC restoration processing unit 409 outputs the restored AC signal as a q-axis current command. Consequently, the control unit 400 can pulsate the q-axis current at the same frequency as that of the DC bus voltage $V_{dc}$ and pulsate the output voltage of the inverter 310.

As described above, the control unit 400 includes a pulsating component extraction unit that extracts at least one specific frequency component from the physical quantity detected by the voltage detection unit 502, and controls the output voltage of the inverter 310 such that the extracted frequency component approaches zero. Alternatively, the control unit 400 may include one or more pulsating component extraction units that extract at least one specific frequency component from the physical quantity detected by the voltage detection unit 502, and change the pulsating component extraction units that extract the frequency component depending on the period of a pulsating component of the extracted frequency component. That is, when the control unit 400 includes two or more pulsating component extraction units capable of extracting frequency components as illustrated in FIG. 7, the control unit 400 may select pulsating component extraction units to use and perform control.

The control unit 400 adds the q-axis current command required to reduce the pulsation of the DC bus voltage $V_{dc}$ to an existing q-axis current command. Here, the existing q-axis current command will be described. The magnetic flux direction of motor magnets is defined as a d-axis, and a direction leading the d-axis by 90 degrees in electrical angle phase, that is, a direction orthogonal to the d-axis is defined as a q-axis. By passing a current Ig through motor coils in the q-axis direction, torque is produced in the motor 314, generating a turning force, which is a known technique. The control unit 400 of the power conversion apparatus 1 connected to the motor 314 typically includes a speed control unit (not illustrated) for controlling the motor 314 to a desired rotational speed. The configuration of the speed control unit may be a general configuration, and thus a detailed description thereof will be omitted. The existing q-axis current command $i_q{}^*$ is expressed as in formula (4) where $i_{qpi}$ is an output of the speed control unit.

$$i_q{}^* = i_{qpi} \qquad (4)$$

Next, the q-axis current command required to reduce the pulsation of the DC bus voltage $V_{dc}$ is expressed as in formula (5) where $I_{qvdc}$ is the amplitude component of the pulsation of the DC bus voltage $V_{dc}$, $2\omega_{in}$ is the angular velocity of a frequency that is twice the fundamental frequency of the first AC voltage supplied from the AC source 110, and $\delta$ is the phase of the pulsation of the DC bus voltage $V_{dc}$.

$$I_{qd2v} = I_{q2f-cos}\sin(2\omega_{in}t) - I_{q2f-sin}\cos(2\omega_{in}t) = I_{qvdc}\sin(2\omega_{in} + \delta) \qquad (5)$$

Therefore, the addition of the q-axis current command required to reduce the pulsation of the DC bus voltage $V_{dc}$ to the existing q-axis current command $i_q{}^*$ is expressed as in formula (6).

$$i_q{}^* = i_{qpi} + I_{qvdc}\sin(2\omega_{in} + \delta) \qquad (6)$$

To reduce the pulsation of the DC bus voltage $V_{dc}$, the control unit 400 generates the q-axis current command $i_q{}^*$ shown in formula (6) to control the operations of the inverter 310, the motor 314, and others. When reducing the pulsation of the DC bus voltage $V_{dc}$ for a plurality of frequencies, specifically, for frequencies two and four times the fundamental frequency of the first AC voltage, the control unit 400 may generate the q-axis current command $i_q{}^*$ shown in formula (7) to control the operations of the inverter 310, the motor 314, and others.

$$i_q{}^* = i_{qpi} + I_{qvdc}\sin(2\omega_{in} + \delta) + I_{qvdc}\sin(4\omega_{in} + \delta) \qquad (7)$$

For a frequency to be controlled together with a frequency twice the fundamental frequency of the first AC voltage, the control unit 400 is not limited to a frequency four times the fundamental frequency of the first AC voltage, and can control one or more frequencies that are multiples of the fundamental frequency of the first AC voltage, such as six times the fundamental frequency of the first AC voltage and eight times the fundamental frequency of the first AC voltage. That is, the control unit 400 superimposes, on the inverter output, pulsation of a harmonic component that is twice the fundamental frequency of the first AC voltage and one or more harmonic components that are multiples of the fundamental frequency of the first AC voltage. In the example of FIG. 4, the frequency of the first ripple is a frequency twice the fundamental frequency of the first AC voltage, which is the power frequency of the AC source 110. In the example of FIG. 7, the frequency of the first ripple is the sum of a frequency component twice the fundamental frequency of the first AC voltage, which is the power frequency of the AC source 110, and a frequency component that is a multiple of the fundamental frequency of the first AC voltage.

The control unit 400 may further add a q-axis current command for vibration reduction control of the motor 314 to the q-axis current command $i_q{}^*$ shown in formula (6) or (7). Load pulsation caused by the rotation of the motor 314 of the compressor 315 can be reduced by a q-axis current command output by a pulsation compensation unit as described, for example, in Japanese Patent No. 6537725. Thus, the control unit 400 may include such a pulsation compensation unit. The q-axis current command output from the pulsation compensation unit is expressed as in formula (8) where $I_{qavs}$ is the amplitude component of the load pulsation of the compressor 315, $\omega_m$ is the angular velocity of the mechanical angular rotation frequency of the compressor 315, and $\varepsilon$ is the phase of the load pulsation of the compressor 315.

$$I_{qavs}\sin(\omega_m + \varepsilon) \qquad (8)$$

The control unit 400 controls the second AC voltage to superimpose a fourth ripple correlated with the above-described third ripple on the output voltage from the inverter 310. Therefore, the addition of the q-axis current command for the vibration reduction control to the q-axis current command in formulas (6) and (7) is expressed as in formulas (9) and (10), respectively.

$$i_q{}^* = i_{qpi} + I_{qvdc}\sin(2\omega_{in} + \delta) + I_{qavs}\sin(\omega_m + \varepsilon) \qquad (9)$$

$$i_q{}^* = i_{qpi} + I_{qvdc}\sin(2\omega_{in} + \delta) + I_{qvdc}\sin(4\omega_{in} + \delta) + I_{qavs}\sin(\omega_m + \varepsilon) \qquad (10)$$

To reduce the pulsation of the DC bus voltage $V_{dc}$ and further perform the vibration reduction control, the control unit 400 generates the q-axis current command $i_q{}^*$ shown in formula (9) or (10) to control the operations of the inverter 310, the motor 314, and others. Here, there is a limit to the amount of current that can be actually passed as the q-axis current, that is, there is a maximum amount of current. Consequently, there may be cases where the amount of current according to the q-axis current command $i_q{}^*$ in formulas (6), (7), (9), and (10) cannot be passed. Therefore, the control unit 400 sets a limit value to the q-axis current command for each control. Ways to set the limit values include, for example, a way of determining the priority order and allocating q-axis currents each time, and a way of allocating q-axis currents at a predetermined ratio from the beginning. For the former, for example, the priority order is determined like $i_{qpi} > I_{qvdc} > I_{qavs}$. For the latter, for example, the limit value of usable q-axis current is divided like $i_{qpi}:I_{qvdc}:I_{qavs}=4:3:3$.

Figure 8:
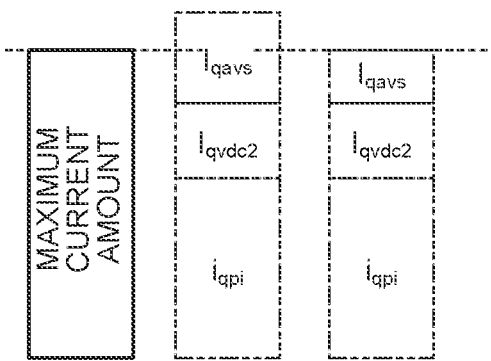
FIG. 8 is a first diagram illustrating the proportions of the amounts of current for controls to a q-axis current command by the control unit of the power conversion apparatus according to the first embodiment.
Figure 9:
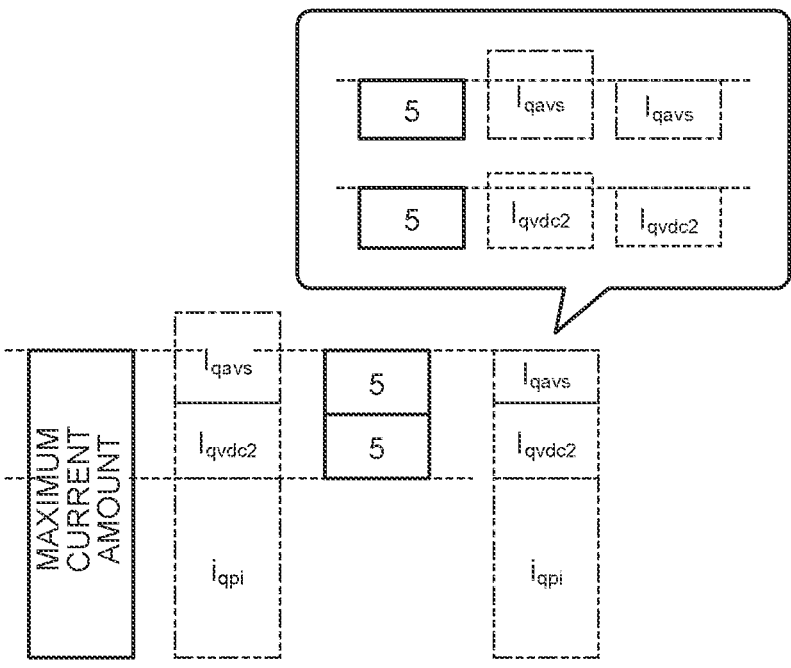
FIG. 9 is a second diagram illustrating the proportions of the amounts of current for controls to a q-axis current command by the control unit of the power conversion apparatus according to the first embodiment.

Alternatively, the control unit 400 may not limit the q-axis current command $i_{qpi}$ from the speed control unit, and may allocate the remaining amount of current when the q-axis current command $i_{qpi}$ is subtracted from the maximum amount of current to the q-axis current command $I_{qvdc}$ for reducing the pulsation of the DC bus voltage $V_{dc}$ and the q-axis current command $I_{qavs}$ from the pulsating load compensation unit. FIG. 8 is a first diagram illustrating the proportions of the amounts of current for the controls to the q-axis current command $i_q{}^*$ by the control unit 400 of the power conversion apparatus 1 according to the first embodiment. FIG. 9 is a second diagram illustrating the proportions of the amounts of current for the controls to the q-axis current command $i_q{}^*$ by the control unit 400 of the power conversion apparatus 1 according to the first embodiment. Note that FIGS. 8 and 9 are for formula (9), and $I_{qvdc2}$ represents $I_{qvdc}$ sin $(2\omega_{in}+\delta)$. As illustrated in FIG. 8, the control unit 400 may allocate the q-axis current command $i_{qpi}$ and the q-axis current command $I_{qvdc2}$ directly to the maximum amount of current, and allocate the remaining amount of current to the q-axis current command $I_{qavs}$. Alternatively, as illustrated in FIG. 9, the control unit 400 may allocate the q-axis current command $i_{qpi}$ directly to the maximum amount of current, and divide the remaining amount of current into two equal parts and allocate them to the q-axis current command $I_{qvdc2}$ and the q-axis current command $I_{qavs}$. When the example of FIG. 9 is applied to formula (10), the control unit 400 may allocate the q-axis current command $i_{qpi}$ directly to the maximum amount of current, and divide the remaining amount of current into three equal parts and allocate them to the q-axis current command $I_{qvdc2}$, the q-axis current command $I_{qvdc4}$, and the q-axis current command $I_{qavs}$. Note that $I_{qvdc4}$ represents $I_{qvdc}$ sin $(4\omega_{in}+\delta)$.

The control unit 400 basically prioritizes the q-axis current command $i_{qpi}$ because if the current of the q-axis current command $i_{qpi}$, which is an output from the speed control unit, is limited, the rotation of the motor 314 cannot be desirably maintained. However, depending on the purpose such as to continue the operation even by reducing the rotational speed of the motor 314, the control unit 400 may limit the q-axis current command $i_{qpi}$. Furthermore, in FIGS. 8 and 9, the control unit 400 may set the ratio for the controls freely depending on the purpose. For example, when vibration is a concern at low speed, the control unit 400 may allocate a large amount of current to the q-axis current command $I_{qavs}$. In this manner, the control unit 400 changes the proportions of the second ripple and the fourth ripple to be superimposed on the output voltage from the inverter 310 at a specified ratio.

As described above, the control unit 400 can reduce the pulsation of the DC bus voltage $V_{dc}$ by superimposing, on the inverter output, pulsation including the same frequency component as the pulsation of the DC bus voltage $V_{dc}$ generated by the AC source 110, which is a single-phase AC source. The control unit 400 uses, as the above-described frequency component, a frequency that is twice the power frequency of the AC source 110, which is a single-phase AC source, that is, the fundamental frequency of the first AC voltage.

The control unit 400 periodically calculates the fundamental frequency of the first AC voltage, which is the power frequency of the AC source 110, which is a single-phase AC source, using the detected value of the voltage detection unit 501. The power frequency of the AC source 110 may slightly fluctuate in frequency even in a day. Therefore, by periodically calculating the fundamental frequency of the first AC voltage, which is the power frequency of the AC source 110, the control unit 400 can improve the accuracy of the controls described so far.

Figure 10:
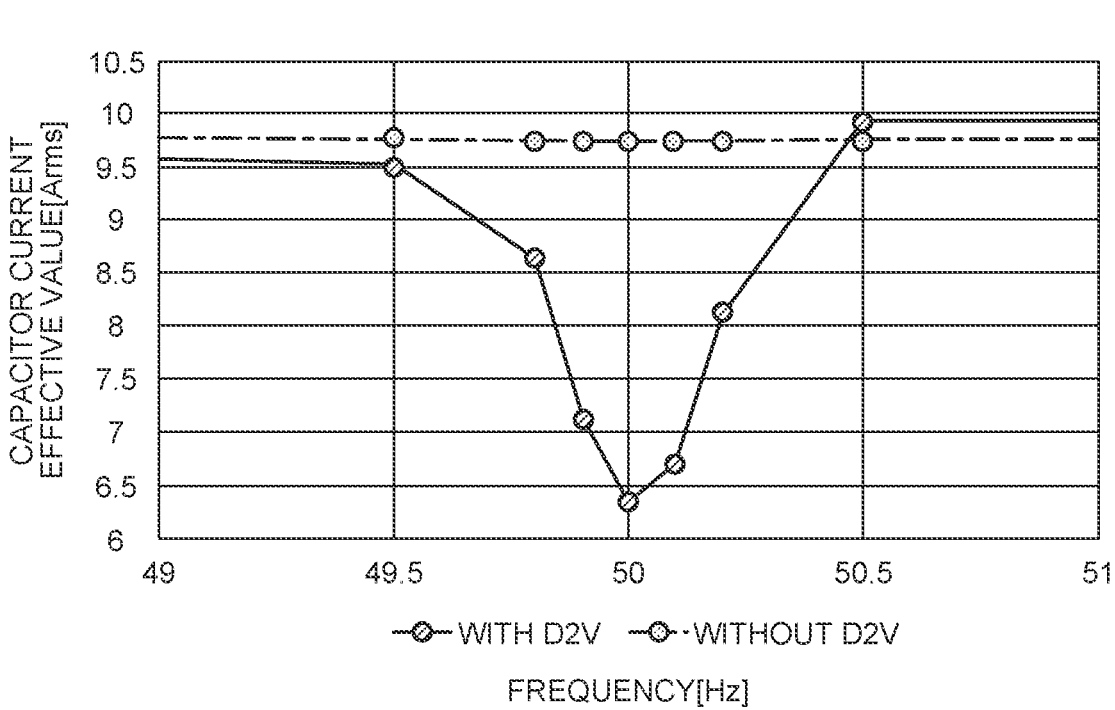
FIG. 10 is a diagram illustrating an example of the relationship between frequency and the effective value of current of the capacitor when the control to reduce the charging and discharging current of the capacitor is performed in the power conversion apparatus according to the first embodiment.

A method by which the control unit 400 periodically calculates the fundamental frequency of the first AC voltage, which is the power frequency of the AC source 110, will be specifically described. The power frequency of the AC source 110 fluctuates by about 0.5 Hz even in a day. FIG. 10 illustrates how much the current of the capacitor 210 decreases relative to the actual power frequency of the AC source 110 when the control unit 400 performs the control to reduce the charging and discharging current I3 of the capacitor 210 on the assumption that the power frequency of the AC source 110 is 50 Hz. FIG. 10 is a diagram illustrating an example of the relationship between the frequency and the effective value of the current of the capacitor 210 when the control to reduce the charging and discharging current I3 of the capacitor 210 is performed in the power conversion apparatus 1 according to the first embodiment. As illustrated in FIG. 10, the effect of the control to reduce the charging and discharging current I3 of the capacitor 210 decreases, that is, the current of the capacitor 210 increases with an error of about 0.1 Hz. Therefore, in order to obtain a desired effect in the control to reduce the charging and discharging current I3 of the capacitor 210, the power conversion apparatus 1 needs to always correctly detect the power frequency of the AC source 110.

As described above, with the DC bus voltage $V_{dc}$ from which the DC component has been removed as $V_{dc} = A \sin(\omega t)$, the pulsating component extraction units 405 and 407 remove the sin component and the cos component by filtering the values obtained by formulas (1) and (2) with the low-pass filters, to extract the amplitude value A of sin ($\omega t$). Here, with an error $\Delta \omega$ in $\omega$ taken into account, the DC bus voltage $V_{dc}$ from which the DC component has been removed is expressed as in formula (11).

$$A\sin(\omega t + \Delta \omega t) = A\sin(\omega t)\cos(\Delta \omega t) + A\cos(\omega t)\sin(\Delta \omega t) \qquad (11)$$

As above, the pulsating component extraction unit 405 multiplies the DC bus voltage $V_{dc}$ from which the DC component has been removed shown in formula (11) by 2 cos ($\omega t$) to obtain formula (12), and the pulsating component extraction unit 407 multiplies the DC bus voltage $V_{dc}$ from which the DC component has been removed shown in formula (11) by 2 sin ($\omega t$) to obtain formula (13).

$$A\sin(\omega t + \Delta \omega t) \times 2\cos(\omega t) = \qquad (12)$$
$$2A\cos(\omega t)\sin(\omega t)\cos(\Delta \omega t) + 2A\cos^2(\omega t)\sin(\Delta \omega t) =$$
$$A\sin(\Delta \omega t) + A\cos(2\omega t)\sin(\Delta \omega t) + A\sin(2\omega t)\cos(\Delta \omega t)$$

$$A\sin(\omega t + \Delta \omega t) \times 2\sin(\omega t) = \qquad (13)$$
$$2A\sin^2(\omega t)\cos(\Delta \omega t) + 2A\sin(\omega t)\cos(\omega t)\sin(\Delta \omega t) =$$
$$A\cos(\Delta \omega t) - A\cos(2\omega t)\cos(\Delta \omega t) + A\sin(2\omega t)\sin(\Delta \omega t)$$

As described above, the pulsating component extraction units 405 and 407 filter the values obtained by formulas (12) and (13) with the low-pass filters to remove the sin component and the cos component. Consequently, the pulsating component extraction units 405 and 407 can extract the amplitude value A including the Aw component of sin ($\omega t + \Delta \omega t$). Specifically, assuming a case where a frequency twice the power frequency of the AC source 110 recognized by the control unit 400 is 100 Hz while a frequency twice the actual power frequency of the AC source 110 is 101 Hz, the DC bus voltage $V_{dc}$ from which the DC component has been removed when a frequency twice the power frequency of the AC source 110 is 101 Hz is expressed as in formula (14).

$$A\sin(\omega t + \Delta \omega t) = A\sin(2\pi 100t + 2\pi 1t) \qquad (14)$$

Therefore, when extracting a pulsating component of 100 Hz in the pulsating component extraction units 405 and 407, the control unit 400 can use formula (14) to obtain formulas (15) and (16) from formulas (12) and (13).

$$A\sin(2\pi 100t + 2\pi 1t) \times 2\cos(2\pi 100t) = \qquad (15)$$
$$A\sin(2\pi 1t) + A\cos(2\pi 100t)\sin(2\pi 1t) + A\sin(2\pi 100t)\cos(2\pi 1t)$$

$$A\sin = (2\pi 100t + 2\pi 1t) \times 2\sin(2\pi 100t) = \qquad (16)$$
$$A\cos(2\pi 1t) - A\cos(2\pi 100t)\cos(2\pi 1t) + A\sin(2\pi 100t)\sin(2\pi 1t)$$

Figure 11:
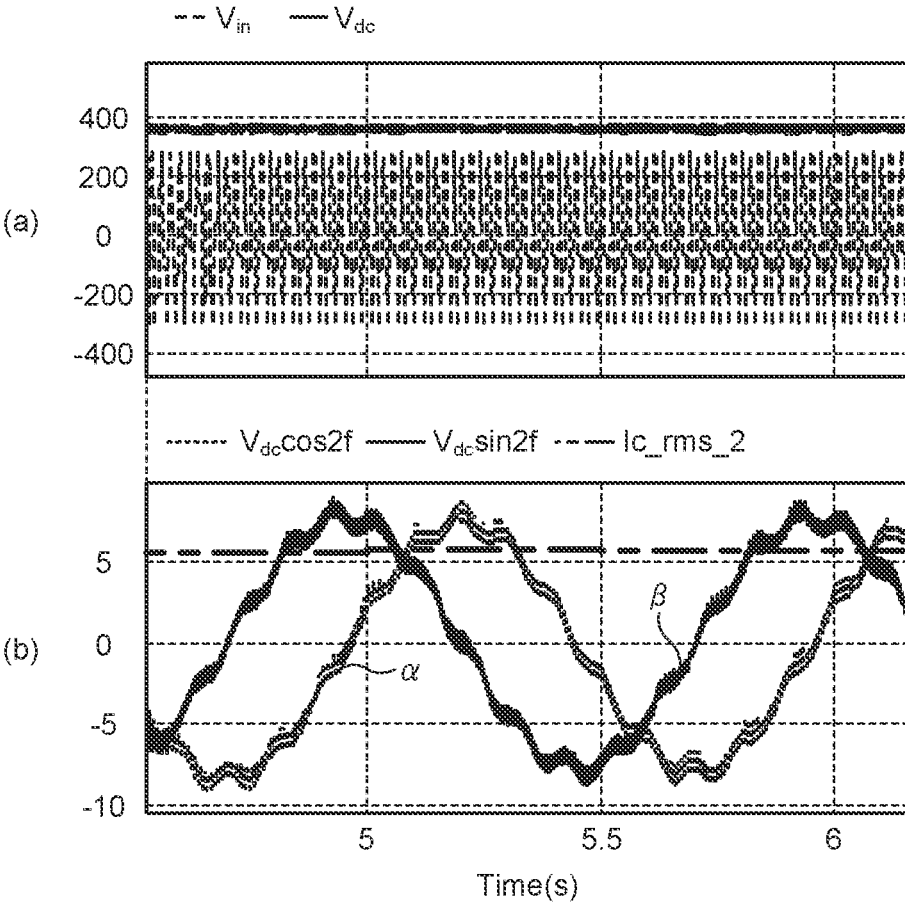
FIG. 11 is a diagram illustrating a concrete example of pulsating component extraction in the power conversion apparatus according to the first embodiment.

As described above, the pulsating component extraction units 405 and 407 filter the values obtained by formulas (15) and (16) with the low-pass filters to remove the sin component and the cos component. Consequently, the pulsating component extraction units 405 and 407 can extract the amplitude value A including the $2\pi 1t$ component of sin ($2\pi 100t + 2\pi 1t$). FIG. 11 is a diagram illustrating a concrete example of pulsating component extraction in the power conversion apparatus 1 according to the first embodiment. In (a) in FIG. 11, $V_{in}$ represents the power frequency of the AC source 110, and $V_{dc}$ represents the DC bus voltage. In (b) in FIG. 11, $\alpha$ represents A sin($2\pi 1t$) in the first term on the right side of formula (15), and $\beta$ represents A cos($2\pi 1t$) in the first term on the right side of formula (16).

The control unit 400 detects the primary voltage or zero-crossings of the AC source 110 to periodically calculate the power frequency of the AC source 110, and constantly updates the power frequency of the AC source 110 recognized by the control unit 400. The control unit 400 may not be able to calculate a correct power frequency by zero-crossing detection due to the effects of noise, a delay in a detection circuit, etc., and thus typically uses several moving averages. If the control unit 400 can detect a frequency of 1 Hz of $2\pi 1t$ by zero-crossing detection for an extracted pulsating component, for example, $V_{dc}$ cos 2f in FIG. 11, and correct the power frequency of the AC source 110 recognized by the control unit 400 from 100 Hz to 101 Hz, the frequency calculation by the zero-crossing detection of the AC source 110 becomes unnecessary.

For example, the voltage detection unit 501 is used as a third detection unit to detect a third physical quantity correlated with the voltage value of the first AC voltage. In this case, the control unit 400 periodically calculates the fundamental frequency of the first AC voltage, which is the power frequency of the AC source 110, from the third physical quantity detected by the voltage detection unit 501.

Alternatively, the voltage detection unit 501 is used as a fourth detection unit to detect that the voltage value of the first AC voltage that changes with the lapse of time exceeds or falls below a specified value. In this case, the control unit 400 periodically calculates the fundamental frequency of the first AC voltage, which is the power frequency of the AC source 110, from an output signal of the voltage detection unit 501. The control unit 400 calculates a value from an output signal of the voltage detection unit 501 two or more times and sets the average value as the fundamental frequency of the first AC voltage, which is the power frequency of the AC source 110.

Figure 12:
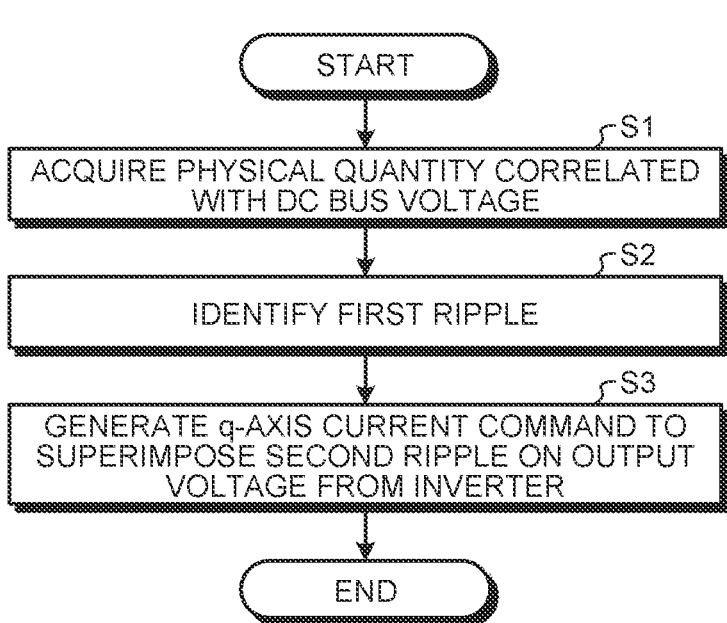
FIG. 12 is a flowchart illustrating the operation of the control unit of the power conversion apparatus according to the first embodiment.

The operation of the control unit 400 will be described with reference to a flowchart. FIG. 12 is a flowchart illustrating the operation of the control unit 400 of the power conversion apparatus 1 according to the first embodiment. In the power conversion apparatus 1, the control unit 400 acquires a physical quantity correlated with the DC bus voltage $V_{dc}$ (step S1). The control unit 400 identifies first ripple included in the DC bus voltage $V_{dc}$ (step S2). The control unit 400 generates a q-axis current command to superimpose second ripple correlated with the first ripple on the output voltage from the inverter 310 (step S3).

Figure 13:
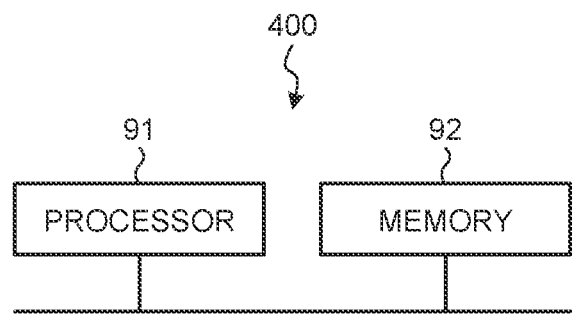
FIG. 13 is a diagram illustrating an example of a hardware configuration that implements the control unit included in the power conversion apparatus according to the first embodiment.

Next, a hardware configuration of the control unit 400 included in the power conversion apparatus 1 will be described. FIG. 13 is a diagram illustrating an example of a hardware configuration that implements the control unit 400 included in the power conversion apparatus 1 according to the first embodiment. The control unit 400 is implemented by a processor 91 and memory 92.

The processor 91 is a central processing unit (CPU, also called a central processor, a processing device, an arithmetic device, a microprocessor, a microcomputer, a processor, and a digital signal processor (DSP)), or a system large-scale integration (LSI). The memory 92 can be exemplified by nonvolatile or volatile semiconductor memory such as random-access memory (RAM), read-only memory (ROM), flash memory, an erasable programmable read-only memory (EPROM), or an electrically erasable programmable read-only memory (EEPROM) (registered trademark). The memory 92 is not limited to these, and may be a magnetic disk, an optical disk, a compact disk, a mini disk, or a digital versatile disc (DVD).

As described above, according to the present embodiment, in the power conversion apparatus 1, the voltage detection unit 502 detects the DC bus voltage $V_{dc}$, and the control unit 400 superimposes, on the inverter output, pulsation including the same frequency component as the pulsation of the DC bus voltage $V_{dc}$ generated by the AC source 110, which is a single-phase AC source, that is, pulsation of a frequency that is twice the fundamental frequency of the first AC voltage, which is the power frequency of the AC source 110, so that the pulsation of the DC bus voltage $V_{dc}$ can be reduced. Furthermore, the power conversion apparatus 1 can reduce the deterioration of the smoothing capacitor 210 while preventing the device from becoming larger.

By detecting the DC bus voltage $V_{dc}$ by the voltage detection unit 502, the power conversion apparatus 1 can reduce the cost of the detection circuit as compared with a case where current flowing through the capacitor 210 is directly detected, and can facilitate the introduction since there is no concern about heat effects. Furthermore, since the DC bus voltage $V_{dc}$ detected by the voltage detection unit 502 is a voltage smoothed by the capacitor 210, the power conversion apparatus 1 eliminates the need for a measure against high-frequency ripple caused by pulse-width modulation (PWM), as compared with a case where current flowing through the capacitor 210 is directly detected. In the power conversion apparatus 1, the capacitance of the capacitor 210 is reduced, so that a pulsating component to be controlled has a high signal-to-noise ratio, facilitating detection. The power conversion apparatus 1, in which the control unit 400 performs feedback control, thus allows control with high robustness. The power conversion apparatus 1, in which the control unit 400 extracts and controls a specific frequency component, thus allows control with waveform distortion reduced.

Second Embodiment

The second embodiment describes a case where a converter includes a booster circuit.

Figure 14:
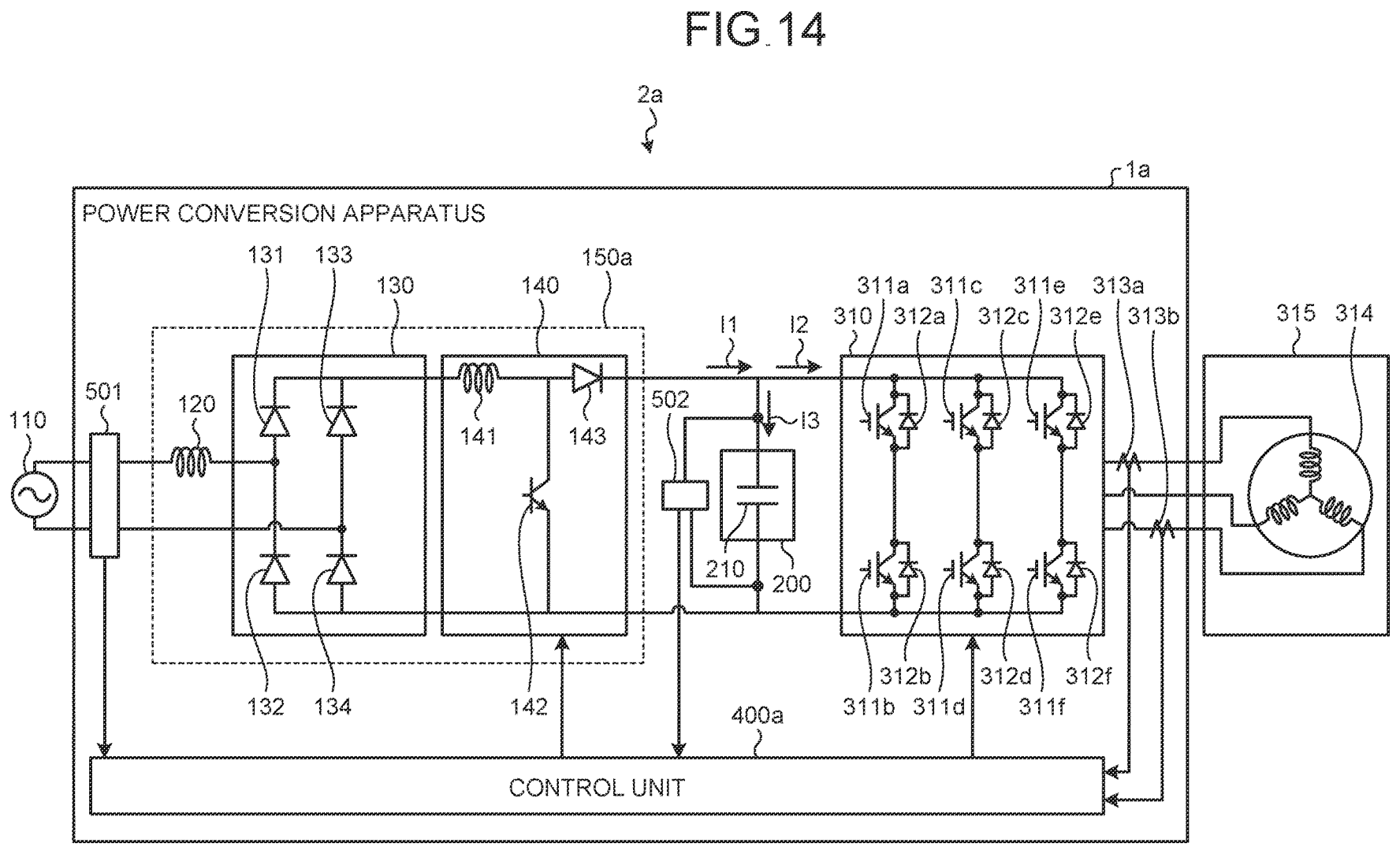

FIG. 14 is a first diagram illustrating an exemplary configuration of a power conversion apparatus 1a according to the second embodiment. The power conversion apparatus 1a is obtained by replacing the converter 150 and the control unit 400 with a converter 150a and a control unit 400a in the power conversion apparatus 1 of the first embodiment illustrated in FIG. 1. The converter 150a includes the reactor

120, the rectifier unit 130, and a booster unit 140. The booster unit 140 includes a reactor 141, a switching element 142, and a rectifier element 143, constituting a booster circuit. The booster unit 140 boosts the voltage rectified by the rectifier unit 130 by the control unit 400a performing on-off control on the switching element 142. The boost operation of the booster unit 140 may be a general one, and thus will not be described in detail. The control unit 400a has a function of performing the on-off control on the switching element 142 of the booster unit 140 in addition to the functions of the control unit 400. That is, the control unit 400a controls the operation of the converter 150a including the booster unit 140. The power conversion apparatus 1a and the motor 314 included in the compressor 315 constitute a motor drive unit 2a.

The power conversion apparatus 1a is equipped with the booster circuit to increase the DC bus voltage $V_{dc}$, thereby eliminating the need for current for, for example, flux-weakening control over the rotation of the motor 314, and thus can increase the amount of current that can be used for a q-axis current more than when the converter 150 is a passive circuit as in the first embodiment. As compared with the power conversion apparatus 1 of the first embodiment, the power conversion apparatus 1a can increase current that can be allocated to $I_{qvdc}$ even at the same load condition, rotational speed, etc., and can enhance the effect of reducing the pulsation of the DC bus voltage $V_{dc}$. The power conversion apparatus 1a needs to detect the voltage that has been boosted by the booster unit 140. However, since the power conversion apparatus 1a includes the voltage detection unit 502 for detecting the DC bus voltage $V_{dc}$, it is not necessary to add a new detection unit in the second embodiment.

Note that the configuration of the converter of the power conversion apparatus including the boost function is not limited to the example of FIG. 14. The converter 150 of the power conversion apparatus 1 in the first embodiment is a passive circuit composed of passive components, and the value of the DC bus voltage $V_{dc}$ is determined by the amplitude value of the first AC voltage supplied from the AC source 110. However, in the first embodiment, it is sufficient that the pulsation of the DC bus voltage $V_{dc}$ can be correctly detected, and pulsation of the same frequency component as that of the pulsation of the DC bus voltage $V_{dc}$ can be output from the inverter 310. Therefore, for example, in the rectifier unit 130, a booster circuit may be configured by replacing the rectifier elements 131 to 134 such as diodes with semiconductor devices, that is, active elements such as switching elements, and the control unit 400 or the like may control the operation of the active elements.

Figure 15:
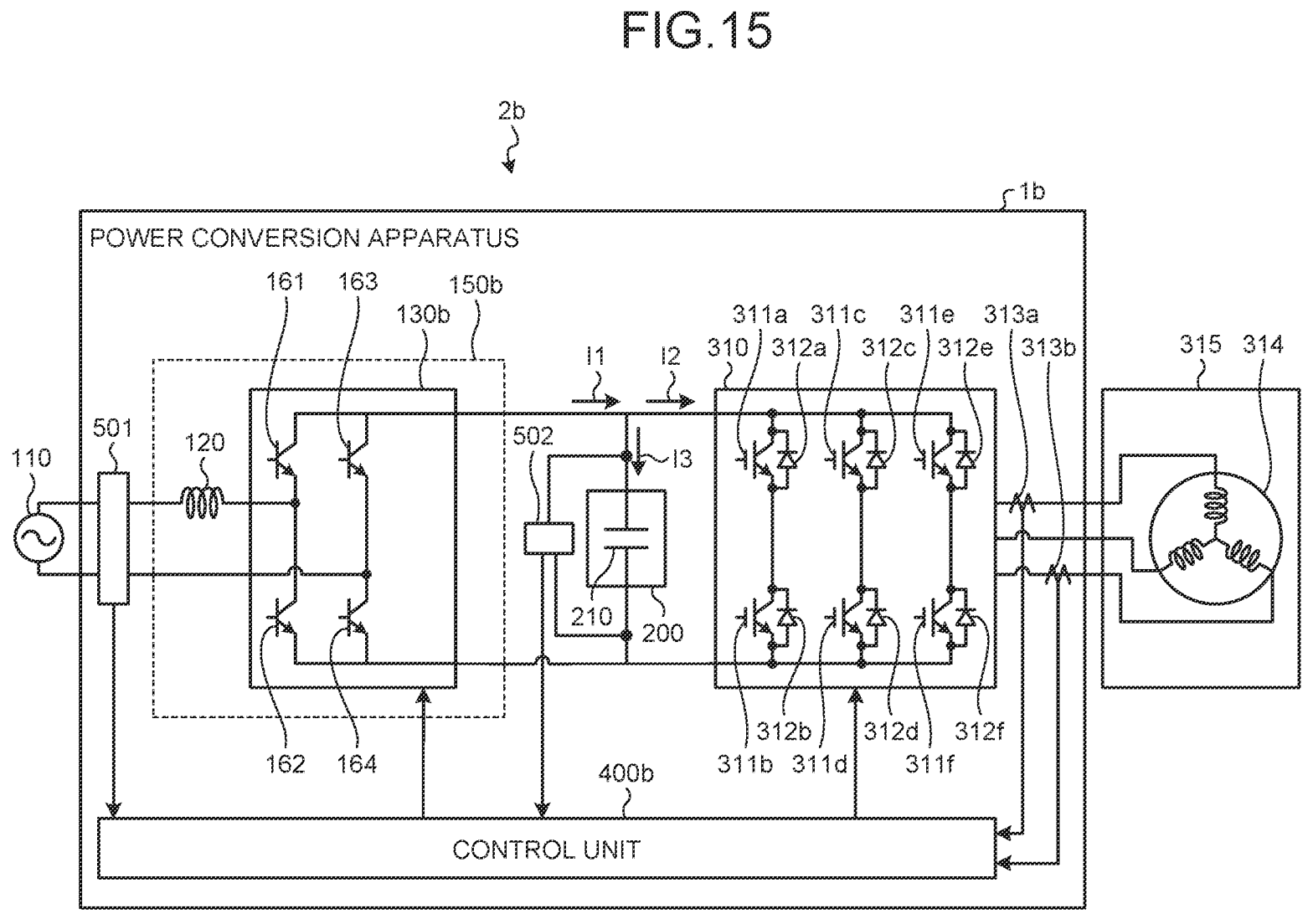

FIG. 15 is a second diagram illustrating an exemplary configuration of a power conversion apparatus 1b according to the second embodiment. The power conversion apparatus 1b is obtained by replacing the converter 150 and the control unit 400 with a converter 150b and a control unit 400b in the power conversion apparatus 1 of the first embodiment illustrated in FIG. 1. The converter 150b includes the reactor 120 and a rectifier unit 130b. The rectifier unit 130b includes switching elements 161 to 164. The switching elements 161 to 164 are, for example, semiconductor devices, and are turned on and off under the control of the control unit 400b. The rectifier unit 130b can boost and output the voltage by the switching elements 161 to 164 being turned on and off. The control unit 400b has a function of performing on-off control on the switching elements 161 to 164 of the rectifier unit 130b in addition to the functions of the control unit 400. That is, the control unit 400b controls the operation of the converter 150*b*. Note that the rectifier unit 130*b* may have a configuration in which some of the four elements are switching elements and the other elements are rectifier elements such as diodes. Also in this case, the same effects as those of the power conversion apparatus 1*a* illustrated in FIG. 14 can be obtained. The power conversion apparatus 1*b* and the motor 314 included in the compressor 315 constitute a motor drive unit 2*b*.

As described above, the converter 150*a* in the power conversion apparatus 1*a* or the converter 150*b* in the power conversion apparatus 1*b* includes at least one switching element. In this case, the voltage detection unit 502 may detect a physical quantity in synchronization with the timing of change in conduction or nonconduction of the switching element(s) included in the converter 150*a* or the converter 150*b*.

Third Embodiment

Figure 16:
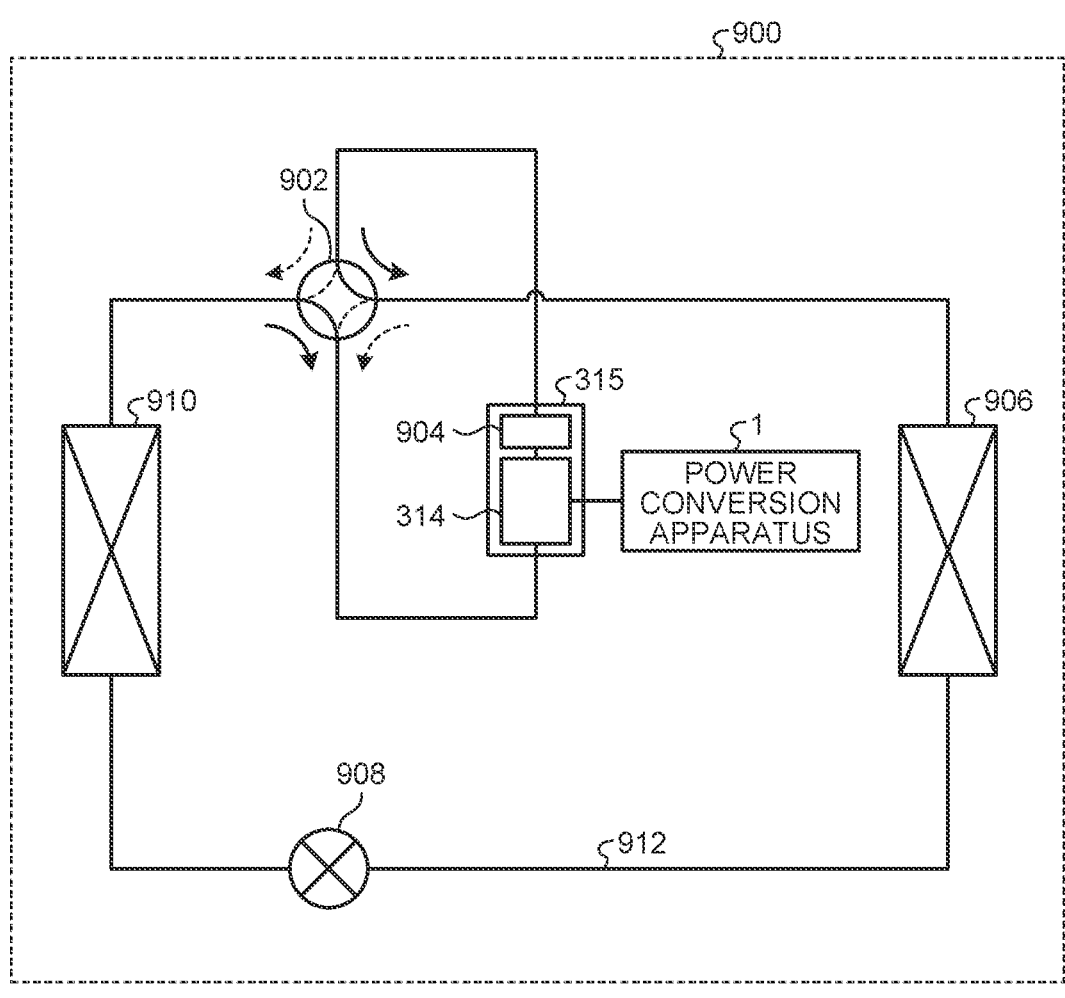
FIG. 16 is a diagram illustrating an exemplary configuration of a refrigeration cycle application apparatus according to a third embodiment.

FIG. 16 is a diagram illustrating an exemplary configuration of a refrigeration cycle application apparatus 900 according to a third embodiment. The refrigeration cycle application apparatus 900 according to the third embodiment includes the power conversion apparatus 1 described in the first embodiment. The refrigeration cycle application apparatus 900 can include the power conversion apparatus 1*a* or the power conversion apparatus 1*b* described in the second embodiment, but here, as an example, a case where the refrigeration cycle application apparatus 900 includes the power conversion apparatus 1 will be described. The refrigeration cycle application apparatus 900 according to the third embodiment can be applied to a product with a refrigeration cycle, such as an air conditioner, a refrigerator, a freezer, or a heat pump water heater. In FIG. 16, components having the same functions as those of the first embodiment are denoted by the same reference numerals as those of the first embodiment.

In the refrigeration cycle application apparatus 900, the compressor 315 incorporating the motor 314 in the first embodiment, a four-way valve 902, an indoor heat exchanger 906, an expansion valve 908, and an outdoor heat exchanger 910 are installed via refrigerant piping 912.

A compression mechanism 904 that compresses a refrigerant and the motor 314 that operates the compression mechanism 904 are provided inside the compressor 315.

The refrigeration cycle application apparatus 900 can perform heating operation or cooling operation by the switching operation of the four-way valve 902. The compression mechanism 904 is driven by the motor 314 that is variable-speed controlled.

During the heating operation, as indicated by solid arrows, the refrigerant is pressurized and delivered by the compression mechanism 904, passes through the four-way valve 902, the indoor heat exchanger 906, the expansion valve 908, the outdoor heat exchanger 910, and the four-way valve 902, and returns to the compression mechanism 904.

During the cooling operation, as indicated by dashed arrows, the refrigerant is pressurized and delivered by the compression mechanism 904, passes through the four-way valve 902, the outdoor heat exchanger 910, the expansion valve 908, the indoor heat exchanger 906, and the four-way valve 902, and returns to the compression mechanism 904.

During the heating operation, the indoor heat exchanger 906 acts as a condenser to release heat, and the outdoor heat exchanger 910 acts as an evaporator to absorb heat. During the cooling operation, the outdoor heat exchanger 910 acts as a condenser to release heat, and the indoor heat exchanger 906 acts as an evaporator to absorb heat. The expansion valve 908 decompresses and expands the refrigerant.

The configurations described in the above embodiments illustrate an example, and can be combined with another known art. The embodiments can be combined with each other. The configurations can be partly omitted or changed without departing from the gist.

The invention claimed is:

1. A power conversion apparatus, comprising:
a converter rectifying a first AC voltage supplied from an AC source;
a capacitor connected to an output end of the converter, the capacitor smoothing a first DC voltage rectified by the converter into a second DC voltage including a first ripple;
an inverter connected across the capacitor, the inverter converting the second DC voltage into a second AC voltage corresponding to a desired frequency;
a detection unit acquiring a physical quantity correlated with the second DC voltage, wherein the second AC voltage is controlled to superimpose a second ripple correlated with the first ripple on an output voltage of the inverter, and
a pulsating component extraction unit extracting at least one specific frequency component from the physical quantity detected by the detection unit, wherein the output voltage of the inverter is controlled such that the extracted frequency component approaches zero,
wherein a frequency of the first ripple is a frequency that is twice a fundamental frequency of the first AC voltage.

2. The power conversion apparatus according to claim 1, comprising
one or more pulsating component extraction units extracting at least one specific frequency component from the physical quantity detected by the detection unit, wherein the pulsating component extraction units extracting the frequency component are changed depending on a period of a pulsating component of the extracted frequency component.

3. The power conversion apparatus according to claim 1, wherein
the inverter is connected to a motor, the detection unit is a first detection unit, and the physical quantity is a first physical quantity,
the power conversion apparatus further comprises a second detection unit acquiring a second physical quantity including a third ripple correlated with a rotational speed generated by the motor, and
the second AC voltage is controlled to superimpose a fourth ripple correlated with the third ripple on the output voltage from the inverter.

4. The power conversion apparatus according to claim 3, wherein
proportions of the second ripple and the fourth ripple to be superimposed on the output voltage from the inverter are changed at a specified ratio.

5. The power conversion apparatus according to claim 1, wherein
a frequency of the first ripple is a sum of a frequency component that is twice a fundamental frequency of the first AC voltage, and a frequency component that is a multiple of the fundamental frequency of the first AC voltage.

6. The power conversion apparatus according to claim 1, wherein the detection unit detects the physical quantity at periods shorter than a frequency of the first ripple.

7. The power conversion apparatus according to claim 1, wherein the detection unit detects the physical quantity in synchronization with a timing of change in conduction or nonconduction of switching elements included in the inverter.

8. The power conversion apparatus according to claim 1, wherein the converter includes at least one switching element.

9. The power conversion apparatus according to claim 8, wherein the detection unit detects the physical quantity in synchronization with a timing of change in conduction or nonconduction of the switching element included in the converter.

10. The power conversion apparatus according to claim 1, wherein either an analog filter including electronic components and attenuating a specific frequency component, or a digital filter attenuating a specific frequency component by calculation is used to attenuate a specific frequency component of the physical quantity.

11. The power conversion apparatus according to claim 10, wherein a cutoff frequency of the analog filter or the digital filter is a frequency two or more times a frequency of the first ripple.

12. The power conversion apparatus according to claim 1, wherein the detection unit is a first detection unit, and the physical quantity is a first physical quantity, the power conversion apparatus further comprises a third detection unit detecting a third physical quantity correlated with a voltage value of the first AC voltage, and a fundamental frequency of the first AC voltage is periodically calculated from the third physical quantity.

13. The power conversion apparatus according to claim 1, wherein the detection unit is a first detection unit, the power conversion apparatus further comprises a fourth detection unit detecting that a voltage value of the first AC voltage that changes with a lapse of time exceeds or falls below a specified value, and a fundamental frequency of the first AC voltage is periodically calculated from an output signal of the fourth detection unit.

14. The power conversion apparatus according to claim 13, wherein a value is calculated from the output signal of the fourth detection unit two or more times, and an average value of the values is set as the fundamental frequency of the first AC voltage.

15. A motor drive unit, comprising the power conversion apparatus according to claim 1.

16. A refrigeration cycle application apparatus, comprising the power conversion apparatus according to claim 1.

17. A power conversion apparatus, comprising:

a converter rectifying a first AC voltage supplied from an AC source;

a capacitor connected to an output end of the converter, the capacitor smoothing a first DC voltage rectified by the converter into a second DC voltage including a first ripple;

an inverter connected across the capacitor, the inverter converting the second DC voltage into a second AC voltage corresponding to a desired frequency;

a detection unit acquiring a physical quantity correlated with the second DC voltage, wherein the second AC voltage is controlled to superimpose a second ripple correlated with the first ripple on an output voltage of the inverter, and one or more pulsating component extraction units extracting at least one specific frequency component from the physical quantity detected by the detection unit, wherein pulsating component extraction units extracting the frequency component are changed depending on a period of a pulsating component of the extracted frequency component, wherein a frequency of the first ripple is a sum of a frequency component that is twice a fundamental frequency of the first AC voltage, and a frequency component that is a multiple of the fundamental frequency of the first AC voltage.

* * * * *